(12) United States Patent
Chou et al.

(10) Patent No.: US 8,243,234 B2
(45) Date of Patent: Aug. 14, 2012

(54) COLOR FILTER SUBSTRATE AND FABRICATING METHOD THEREOF, LCD PANEL AND LCD DEVICE

(75) Inventors: Ming-Lung Chou, Tainan County (TW); Yu-Jen Chen, Tainan County (TW); Hsuan-Yang Shih, Tainan County (TW)

(73) Assignee: Chimei Innolux Corporation, Miao-Li County (TW)

( * ) Notice: Subject to any disclaimer, the term of this patent is extended or adjusted under 35 U.S.C. 154(b) by 1226 days.

(21) Appl. No.: 11/535,178

(22) Filed: Sep. 26, 2006

(65) Prior Publication Data

US 2007/0071912 A1    Mar. 29, 2007

(30) Foreign Application Priority Data

Sep. 27, 2005  (TW) ................. 94133518 A
Apr. 7, 2006   (TW) ................. 95112358 A

(51) Int. Cl.
  *G02F 1/1335*  (2006.01)
(52) U.S. Cl. ......... 349/106; 349/129; 349/130; 349/141
(58) Field of Classification Search .............. None
  See application file for complete search history.

(56) References Cited

U.S. PATENT DOCUMENTS

| | | | | |
|---|---|---|---|---|
| 4,853,296 | A | * | 8/1989 | Fukuyoshi ................ 428/623 |
| 6,396,559 | B1 | * | 5/2002 | Kishimoto et al. ......... 349/156 |
| 6,582,862 | B1 | * | 6/2003 | Nakamura et al. ............ 430/7 |
| 7,170,575 | B2 | * | 1/2007 | Coates et al. ............. 349/123 |
| 7,170,577 | B2 | * | 1/2007 | Sitrick et al. ............. 352/89 |
| 2004/0105051 | A1 | * | 6/2004 | Chuang et al. ............ 349/106 |
| 2004/0169777 | A1 | | 9/2004 | Tanaka et al. |
| 2005/0179853 | A1 | * | 8/2005 | Chen et al. .............. 349/155 |
| 2005/0190336 | A1 | * | 9/2005 | Chen .................... 349/155 |
| 2007/0002219 | A1 | * | 1/2007 | Lee et al. ............... 349/106 |
| 2007/0076161 | A1 | * | 4/2007 | Morii ................... 349/155 |

FOREIGN PATENT DOCUMENTS

| | | |
|---|---|---|
| CN | 1529199 A | 9/2004 |
| CN | 1537256 A | 10/2004 |
| JP | 2308105 A | 12/1990 |

* cited by examiner

*Primary Examiner* — Thanh-Nhan P. Nguyen
(74) *Attorney, Agent, or Firm* — Lowe Hauptman Ham & Berner LLP

(57) ABSTRACT

A color filter substrate has a transparent substrate; a color filter layer, disposed on the transparent substrate; an inorganic layer, disposed in a predetermined spatial relationship with the color filter layer; and a patterned conductive layer, disposed with the inorganic layer, wherein the patterned conductive layer has a plurality of slits exposing a portion of the inorganic layer.

26 Claims, 18 Drawing Sheets

COLOR FILTER SUBSTRATE AND FABRICATING METHOD THEREOF, LCD PANEL AND LCD DEVICE

CROSS-REFERENCE TO RELATED APPLICATIONS

The present application is based on, and claims priority from Taiwanese Patent Application Number 094133518 filed Sep. 27, 2005, and Taiwanese Patent Application Number 95112358 filed on Apr. 7, 2006, the disclosures of which are hereby incorporated by reference herein in their entirety.

BACKGROUND OF THE INVENTION

1. Field of the Invention

The present invention relates to a display device, and more particularly, to a color filter substrate and fabricating method thereof, an LCD panel, and an LCD device.

2. Description of Related Art

Along with the increasing demand of display devices day by day, manufacturers in this industry have endeavored to improve the quality of display devices. Conventionally, since the cathode ray tube (CRT) is fully developed and has good display quality, the CRT has been adopted in a variety of applications for a long time. However, because of the emerge of environmental concerns, the bulky CRT having high energy consumption, high radiation, and limited flattening capability is gradually unable to meet the market trend that requires a light, thin, short, small and aesthetically pleasing device with low power consumption. Thus, thin film transistor liquid crystal display (TFT LCD) has become the mainstream product in the market due to its superior properties of high definition, high space utilization, low power consumption and no radiation, etc.

The TFT LCD panel is mainly composed of an LCD panel and a backlight module, in which the LCD panel is mainly composed of a thin film transistor array substrate, a color filter substrate, and a liquid crystal layer disposed between the two substrates. In addition, the back light module provides the surface light source required by the LCD panel, so as to achieve the display effect of the TFT LCD.

FIGS. 1A to 1C are schematic cross-sectional views of the conventional fabricating method of the color filter substrate. Referring to FIG. 1A, the conventional fabricating method of the color filter substrate includes the following steps. First, a transparent substrate 110 is provided, and then a black matrix (BM) 120 is formed on the transparent substrate 110. Next, a color filter layer 130 is formed on the transparent substrate 110. Following this, a sputtering process is performed to form a conductive layer 140 on the transparent substrate 110 to cover the color filter layer 130 and the BM 120.

Referring to FIG. 1B, in the multi-domain vertical alignment (MVA) wide viewing angle technology, protrusions or slits are commonly used to make the molecules of liquid crystal generate multi-domain alignment. The fabrication of the slits is generally as follows: a patterned photoresist layer 150 is formed on the conductive layer 140, wherein the photoresist layer 150 has a plurality of slits 150a to partially expose the conductive layer 140. Next, an etching process used for the conductive layer 140 is performed by using the photoresist layer 150 as a mask so as to form a patterned conductive layer 142. Wherein, the patterned conductive layer 142 has a plurality of slits 142a to partially expose the color filter layer 130.

Finally, the patterned photoresist layer 150 is removed to form a structure as shown in FIG. 1C. Thereby, the fabrication of the conventional color filter substrate 100 is initially completed. It should be noted that a side etching phenomenon is often occurred on the patterned conductive layer 142 due to the wet etching process. As a result, the width of the slits 142a of the conductive layer 142 is larger than that of the slits 150a of the patterned photoresist layer 150 (as shown in FIG. 1B), and the difference L1 is the so-called "critical dimension loss" (CD loss). Generally speaking, the CD loss is normally larger than 0.6 micrometer. Nevertheless, as the slits 142a of the patterned conductive layer 142 are developed toward "fine slits", the size requirement of the CD loss is stricter. Thus, the level of the existing process will become gradually unacceptable.

In addition, since the slits 142a of the patterned conductive layer 142 partially expose the color filter layer 130, moisture or ions can easily penetrate into the color filter layer 130 through the slits 142a. After an LCD panel is assembled, moisture or ions inside the color filter layer 130 are likely to infiltrate into the liquid crystal layer and contaminate liquid crystals. Furthermore, in the etching process of forming the slits 142a, the adhesion between the patterned conductive layer 142 and the color filter layer 130 composed of organic material is weakened due to the impurities such as moisture or ions. As a result, the patterned conductive layer 142 and the color filter layer 130 may easily peel off. Consequently, not only the CD loss of the slits 142a of the patterned conductive layer 142 is relatively large, but the contour of the slits 142a of the patterned conductive layer 142 are also inconsistent and variations of the CD loss are too large. In other words, the slits 142a of the prior art will cause a decrease of the reliability of the conventional color filter substrate 100.

The conductive layer (or the patterned conductive layer) of the TFT array substrate generally serves to generate the electrical field and connect circuits. Therefore, the thickness thereof is required not to be excessively thick. A range between 300 to 500 Å and a surface resistance between 40 to 100 Ohm/square ($\Omega/\square$) are generally acceptable.

In addition to forming the electrical field, the conductive layer 140 (or the patterned conductive layer 142) of the color filter substrate should be thick enough to fully cover the color filter layer 130, so that the impurities contained in the color filter layer 130 can be prevented from being released and infiltrating into the liquid crystal layer to contaminate the liquid crystals after the LCD device (not shown) is assembled, and therefore affect the characteristic of the display. The viewing angle of the known vertical alignment LCD can be improved by setting the liquid crystal molecule orientation in the region of each pixel in several different directions. European Patent Publication No. 0884626-A2 discloses a multi-domain vertically aligned LCD, which has a domain adjustable structure for adjusting the liquid crystal molecule orientation. When a voltage is applied, the liquid crystal molecules in the liquid crystal layer align in tilt angles so that the liquid crystal molecule orientation in the regions of each pixel has several directions. In general, the domain adjustable structure is disposed above the conductive layer; therefore, after the LCD is assembled, it is possible that the impurities contained in the domain adjustable structure are released and infiltrate into the liquid crystal layer to contaminate the liquid crystals. Additionally, an organic over coating (OC) layer made of special materials can be used to cover the color filter layer 130 to prevent the impurities from being released from the color filter layer 130 and infiltrating into the liquid crystal layer to contaminate the liquid crystals. However, the material of the organic over coating (OC) layer is rare and expensive, and is controlled by a limited few manufacturers. Furthermore, in order to prevent the conductive layer from being cracked when the spacers formed thereon are pressed, and the material inside the color filter layer being released into the liquid crystal layer contaminating the liquid crystals, and influencing the property of the LCD, the conductive layer 140 should have a sufficient thickness (generally between 1400~1600 angstrom) to enhance the pressure resistance. The material of the conductive layer 140 of a general transmissive LCD is indium tin oxide (ITO). However, because of excessive pressure onto the surface of the LCD, the ITO under the spacers will crack so as to cause abnormality of cell gaps in the local regions. Consequently, the brightness between the region and other regions is not uniform, thereby affecting the display property.

Moreover, a general TFT LCD utilizes the electrical field between the conductive layer (or the patterned conductive layer) and the color filter substrate to control the liquid crystal layer sandwiched between two substrates. Therefore, if foreign objects/contaminants are present in the two substrates, the disposition of the electrical field will be affected, causing malfunction of the pixels where the foreign objects exist. Ultimately, a constant bright spot or dark spot will be formed, and the viewing quality of the LCD will be affected.

SUMMARY OF THE INVENTION

A first aspect of the invention resides in the provision of a color filter substrate to reduce the peeling-off problem of the patterned conductive layer.

Another aspect of the invention resides in the provision of a liquid crystal display (LCD) panel with improved reliability.

Another aspect of the invention resides in the provision of an LCD device, which improves acid resistance, alkali resistance, and chemical resistance.

In addition, another aspect of the invention resides in the provision of a fabricating method of a color filter substrate to reduce the CD loss.

Based on the above and other aspects, a further aspect of the present invention pertains to the provision of a color filter substrate including a transparent substrate, a color filter layer, an inorganic layer, and a patterned conductive layer, wherein the color filter substrate is disposed on the transparent substrate. The inorganic layer is disposed in a predetermined spatial relationship with the color filter layer. The patterned conductive layer is disposed in contact with the inorganic layer, and the patterned conductive layer has a plurality of slits exposing a portion of the inorganic layer.

Further in accordance with the above, another aspect of the present invention resides in the provision a color filter substrate including a transparent substrate, a color filter layer, an inorganic layer, and a patterned conductive layer, wherein the color filter substrate is disposed on the transparent substrate. The inorganic layer is disposed in a predetermined relationship with the color filter layer. The conductive layer is such that the inorganic layer is disposed between the conductive layer and the color filter layer, or the conductive layer is disposed between the inorganic layer and the color filter layer.

Further, another aspect of the present invention resides in the provision of an LCD panel, which includes a color filter substrate, an opposite substrate, and a liquid crystal layer, wherein the liquid crystal layer is disposed between the color filter substrate and the opposite substrate. In addition, the color filter substrate includes a transparent substrate, a color filter layer, an inorganic layer, and a patterned conductive layer, wherein the color filter layer is disposed on the transparent substrate. The inorganic layer is disposed in a predetermined spatial relationship with color filter layer. The patterned conductive layer is disposed in contact with the inorganic layer, and the patterned conductive layer has a plurality of slits exposing a portion of the inorganic layer.

Yet another aspect of the present invention resides in the provision of an LCD panel, which includes a color filter substrate, an opposite substrate, and a liquid crystal layer, wherein the liquid crystal layer is disposed between the color filter substrate and the opposite substrate. In addition, the color filter substrate includes a transparent substrate, a color filter layer, an inorganic layer, and a conductive layer, wherein the color filter layer is disposed on the transparent substrate. The inorganic layer is arranged to have a predetermined spatial relationship with the color filter layer. The conductive layer is disposed such that the inorganic layer is disposed between the conductive layer and the color filter layer, or the conductive layer is disposed between the inorganic layer and the color filter layer.

According to one embodiment of the present invention, the LCD panel further includes a sealant, which is disposed between the color filter substrate and the opposite substrate circling the liquid crystal layer.

Another aspect of, the present invention resides in the provision of an LCD device, which includes a backlight module and an LCD panel, wherein the LCD panel is disposed above the backlight module. In addition, the LCD panel includes a color filter substrate, an opposite substrate, and a liquid crystal layer, wherein the liquid crystal layer is disposed between the color filter substrate and the opposite substrate. Moreover, the color filter substrate includes a transparent substrate, a color filter layer, an inorganic layer, and a patterned conductive layer, wherein the color filter layer is disposed on the transparent substrate. The inorganic layer is disposed in a predetermined spatial relationship with the color filter layer. The patterned conductive layer is disposed in contact with the inorganic layer, and the patterned conductive layer has a plurality of slits exposing a portion of the inorganic layer.

Another aspect of the invention resides in the provision of an LCD device, which includes a backlight module and an LCD panel, wherein the LCD panel is disposed above the backlight module. In addition, the LCD panel includes a color filter substrate, an opposite substrate, and a liquid crystal layer, wherein the liquid crystal layer is disposed between the color filter substrate and the opposite substrate. Furthermore, the color filter substrate includes a transparent substrate, a color filter layer, an inorganic layer, and a conductive layer, wherein the color filter layer is disposed on the transparent substrate. The inorganic layer is disposed so as to be in a predetermined spatial relationship with the color filter layer. The conductive layer is arranged so that the inorganic layer is disposed between the conductive layer and the color filter layer, or the conductive layer is disposed between the inorganic layer and the color filter layer.

According to one embodiment of the present invention, the conductive layer of the color filter substrate is in contact with the inorganic layer.

According to one embodiment of the present invention, the color filter substrate further includes a plurality of spacers disposed on the inorganic layer or the conductive layer.

According to one embodiment of the present invention, the spacers of the color filter substrate are disposed above the color filter layer and are directly in contact with the inorganic layer.

According to one embodiment of the present invention, the spacers of the color filter substrate are disposed above the color filter layer and are directly in contact with the conductive layer.

According to one embodiment of the present invention, the spacers of the color filter substrate are disposed on the conductive layer, and are disposed between the conductive layer and the inorganic layer.

According to one embodiment of the present invention, the color filter substrate further includes a plurality of protrusions disposed on the color filter substrate, and the protrusions are disposed between the conductive layer and the inorganic layer.

According to one embodiment of the present invention, the protrusions are disposed on the color filter substrate, and are between the color filter layer and the inorganic layer.

According to one embodiment of the present invention, the conductive layer of the color filter substrate is a patterned conductive layer which has a plurality of slits.

According to one embodiment of the present invention, the color filter substrate further includes a black matrix (BM) disposed on the transparent substrate, and the color filter layer covers at least a part of BM.

According to one embodiment of the present invention, the spacers of the color filter substrate are disposed over the BM and are directly in contact with the conductive layer.

According to one embodiment of the present invention, the color filter substrate further includes an organic over coating (OC) layer disposed between the color filter layer and the inorganic layer.

According to one embodiment of the present invention, the material of the inorganic layer can be ceramic or diamond like carbon (DLC). In addition, the ceramic material can be selected from one of the groups consisting of $SiO_2$, $SiN_xO_y$, $TiO_2$, TiNO, quartz, SiOC, $CrO_x$, $CrN_xO_y$, $AlO_x$ and $AlN_xO_y$.

According to one embodiment of the present invention, the thickness of the inorganic layer can be between 10 angstrom (Å) and 2 micrometer (μm). Additionally, the preferred thickness of the inorganic layer can be between 50 Å and 500 Å.

According to one embodiment of the present invention, the thickness of the conductive layer can be between 100 Å and 1000 Å.

Based on the above and other objectives, the present invention provides a fabricating method of the color filter substrate. The fabricating method of the color filter substrate includes the following steps. First, a color filter layer is formed on a transparent substrate. An inorganic layer is formed in a predetermined spatial relationship with color filter layer. A patterned conductive layer is formed in contact with the inorganic layer, wherein the patterned conductive layer has a plurality of slits exposing a portion of the inorganic layer.

Based on the above and other aspects, a further aspect of the present invention resides in the provision of a fabricating method of the color filter substrate, which includes the following steps. A color filter layer is formed on a transparent substrate. An inorganic layer is formed so as to have a predetermined spatial relationship with the color filter layer. A conductive layer is formed in contact with the inorganic layer in a manner wherein the inorganic layer is formed before the conductive layer is formed, or the conductive layer is formed before the inorganic layer is formed.

According to one embodiment of the present invention, after forming the conductive layer and the inorganic layer, a plurality of spacers are formed on the conductive layer or on the inorganic layer.

According to one embodiment of the present invention, after forming the conductive layer, the conductive layer is patterned to form a patterned conductive layer, and the patterned conductive layer has a plurality of slits.

According to one embodiment of the present invention, before forming the color filter layer, a black matrix (BM) can be formed on the transparent substrate, and the color filter substrate covers the BM.

According to one embodiment of the present invention, after the color filter layer is formed, an organic over coating layer is formed thereon, and the inorganic layer covers the organic OC layer.

According to one embodiment of the present invention, the method of forming the inorganic layer can be physical vapor deposition (PVD), sputtering process, chemical vapor deposition (CVD), plasma enhance chemical vapor deposition (PECVD) or sol-gel.

In summary, in accordance with embodiments of the present invention, before or after forming the conductive layer, an inorganic layer is formed. The inorganic layer not only protects the structure underneath, but also reduces the side etch problem caused by the etching process of patterning the conductive layer. Therefore, compared with the prior art, the embodiments of the present invention decreases the CD loss, and improves the acid resistance, alkali resistance, chemical resistance, and pressure resistance of the whole structure. In addition, the embodiments of the present invention can also form an inorganic layer after forming the conductive layer, and still have the same function described above.

A description of the preferred embodiments accompanied with reference to the figures is set forth below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EXEMPLARY EMBODIMENTS

Figure 1A:
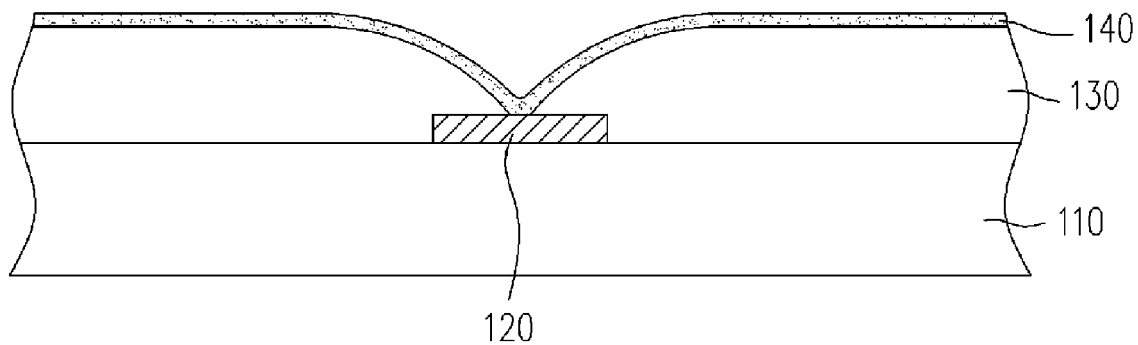
FIGS. 1A to 1C are schematic cross-sectional views of the conventional fabricating method of the color filter substrate.
Figure 1B:
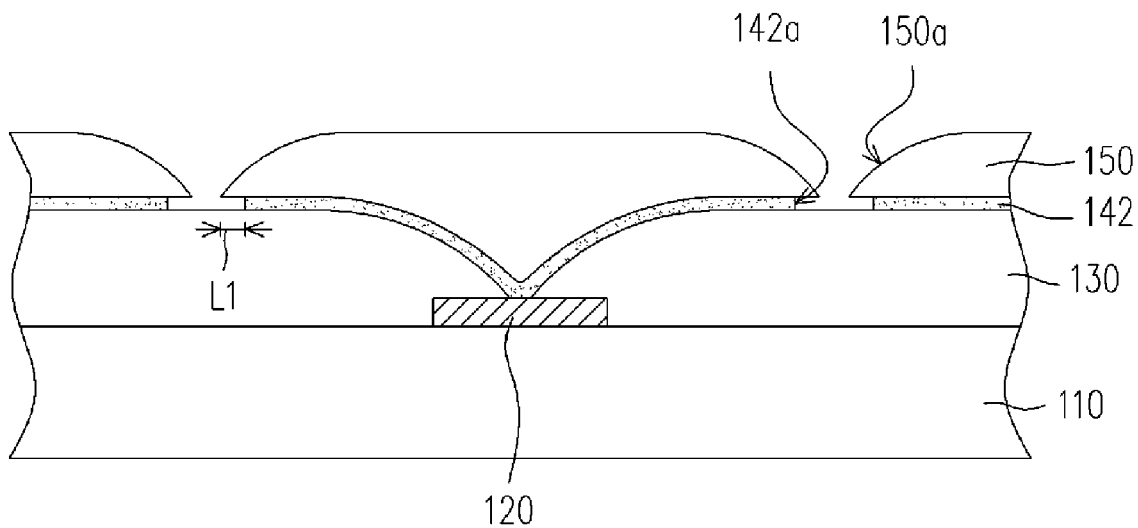
Figure 1C:
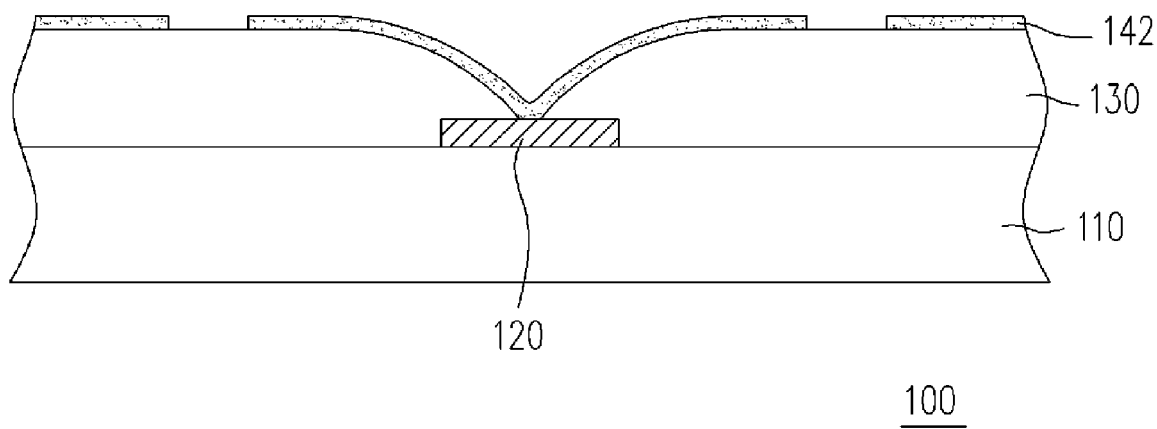

Reference will now be made in detail to the present preferred embodiments of the invention, examples of which are illustrated in the accompanying drawings. Wherever possible, the same reference numbers are used in the drawings and the description to refer to the same or like parts.

First Embodiment

Figure 2A:
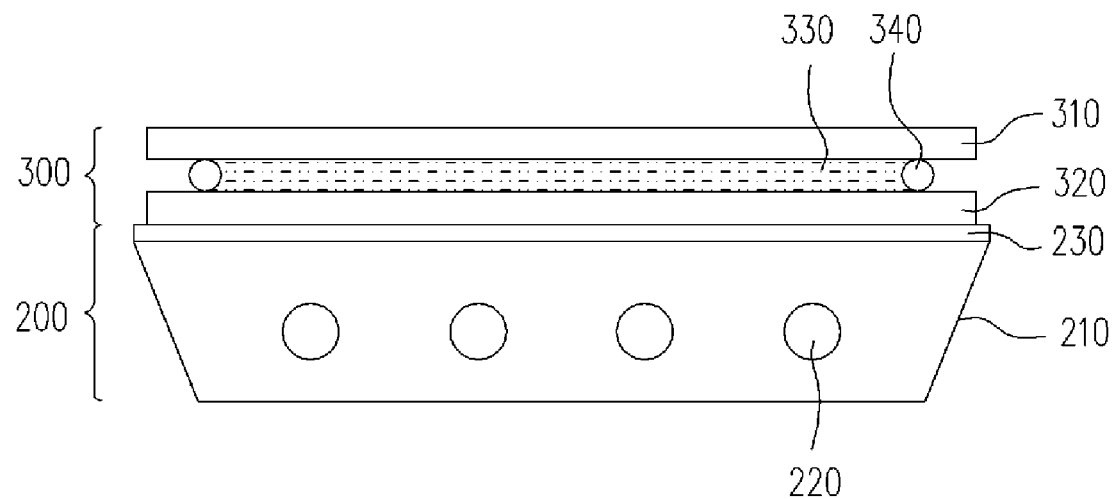
FIG. 2A is a schematic cross-sectional view showing an LCD device according to the first embodiment of the present invention.
Figure 2B:
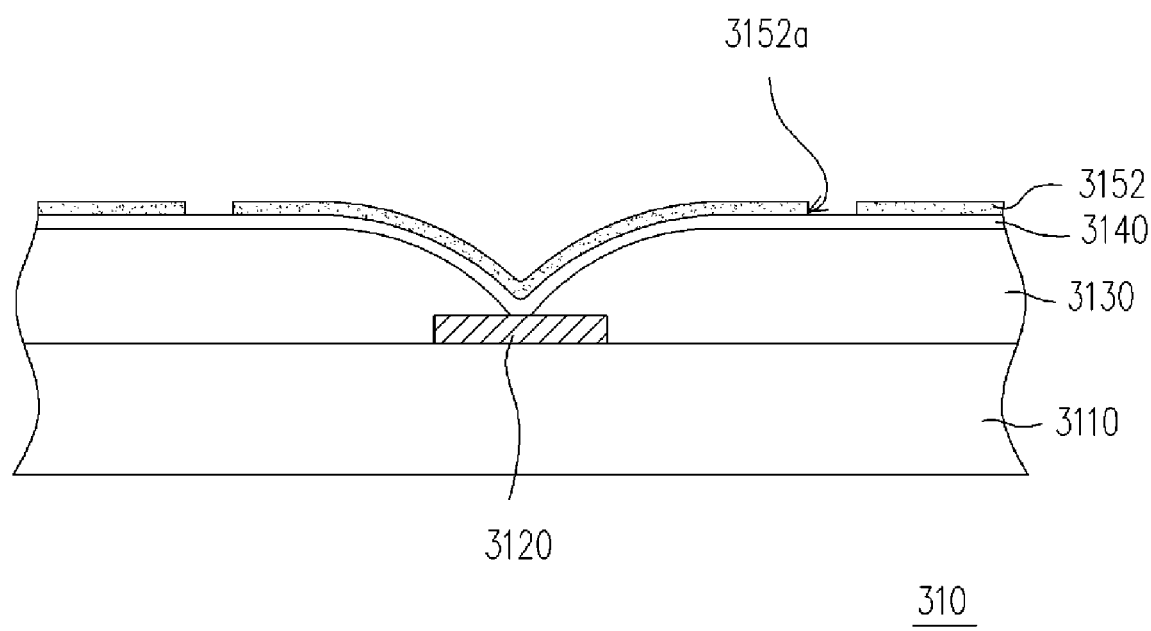
FIG. 2B illustrates the cross-sectional view of the color filter substrate in FIG. 2A.

FIG. 2A is a schematic cross-sectional view showing an LCD device according to the first embodiment of the present invention. FIG. 2B illustrates the cross-sectional view of the color filter substrate in FIG. 2A. Referring to FIG. 2A, the LCD device 10 of the present embodiment includes a direct type backlight module 200 and an LCD panel 300, wherein the LCD panel 300 is disposed on the direct type backlight module 200. In addition, the direct type backlight module 200 includes a frame 210, a plurality of light sources 220, and a diffusion plate 230, wherein the light sources 220 are disposed in the frame 210 and the diffusion plate 230 is disposed on the frame 210. A surface light source is formed when the light of the light sources 220 is emitted from the surface of the diffusion plate 230. Though the direct type backlight module 200 is used for providing the surface light source in the present embodiment, an edge type backlight module can be used to provide the surface light source in the present embodiment.

The LCD panel 300 includes a color filter substrate 310, an opposite substrate 320 and a liquid crystal layer 330, wherein the liquid crystal layer 330 is disposed between the color filter substrate 310 and the opposite substrate 320. In addition, the LCD panel 300 may include a sealant 340 and electrical contacts (not shown), wherein the sealant 340 is disposed between the color filter substrate 310 and the opposite substrate 330 and encompassed the liquid crystal layer 330, and the electrical contacts are electrically connected to the color filter substrate and the TFT array substrate. In the present embodiment, the opposite substrate 320 is a TFT array substrate. However, the opposite substrate 320 can be a diode array substrate or other active device array substrate.

In another embodiment, the color filter substrate can be a COA substrate, and the opposite substrate is a glass substrate having a common electrode, wherein the COA substrate is a structure of a color filter on array (COA). The color filter substrate 310 can be used in the MVA-LCD or a Vertically Alignment LCD (VA-LCD).

Referring to FIG. 2B, the color filter substrate 310 includes a transparent substrate 3110, a color filter layer 3130, an inorganic layer 3140, and a patterned conductive layer 3152, wherein the color filter layer 3130 is disposed on the transparent substrate 3110. In addition, the inorganic layer 3140 is disposed in a manner wherein it covers the color filter layer 3130. The patterned conductive layer 3152 is disposed on the inorganic layer 3140, and the patterned conductive layer 3152 has a plurality of slits 3152a exposing a portion of the inorganic layer 3140. In the present embodiment, the color filter substrate 310 can include a black matrix (BM) 3120 disposed on the transparent substrate 3110. The color filter layer 3130 covers the BM 3120. However, it is should be noted that the present embodiment does not require that the color filter substrate 310 should include the BM 3120.

In the present embodiment, the transparent substrate 3110 is a glass substrate. In addition, the transparent substrate 3110 can be a quartz substrate or a transparent substrate consisting of other materials. The material of the BM 3120 can be light shielding resin or metal, and the thickness of the color filter layer 3130 can be larger than 2 micrometer. In addition, the thickness of the patterned conductive layer 3152 is, for example, 700 Å, and the material of the patterned conductive layer 3125 is, for example, indium tin oxide (ITO), indium zinc oxide (IZO), aluminum zinc oxide (AZO), or other transparent oxides.

The experimental set of the first embodiment is as shown in Table 1:

The material of the inorganic layer in experiment A is formed by a sputtering process with a silicon target. The oxygen flow rate is 8 sccm (standard cubic centimeter per minute) while the nitrogen flow rate is 40 sccm.

The material of the inorganic layer in experiments B and C is formed by a sputtering process with a target comprising 90% silicon and 10% aluminum alloy, and with an oxygen flow rate of 8 sccm.

The material of the inorganic layer in experiment D is formed by a sputtering process which uses a chromium target, a $CO_2$ flow rate of 228.3 sccm and a nitrogen flow rate of 33 sccm.

The material of the inorganic layer in experiments E~G is formed by a sputtering process with a chromium target, and the $CO_2$ flow rate is 500 sccm.

TABLE 1

| Experiments | Material of inorganic layer | Thickness of inorganic layer (angstrom) | Material of conductive layer | Thickness of conductive layer (angstrom) | Reliability test |
|---|---|---|---|---|---|
| Experiment A | $SiO_xN_y$ | 200 | ITO | 700 | OK |
| Experiment B | $SiAlO_x$ | 100 | ITO | 1000 | OK |
| Experiment C | $SiAlO_x$ | 200 | ITO | 1000 | OK |
| Experiment D | $CrO_xN_y$ | 350 | ITO | 700 | OK |
| Experiment E | $CrO_x$ | 350 | ITO | 1000 | OK |
| Experiment F | $CrO_x$ | 350 | ITO | 700 | OK |
| Experiment G | $CrO_x$ | 500 | ITO | 1000 | OK |

The above experiments are the measurement results of the LCD module using the color filter substrate of the present embodiment.

Reliability test: the display device is switched to a black and white mosaic frame for 168 hours at 55° C., and then switched to a 25% whole gray frame. In the event that there is no image sticking with a mosaic edge which can be detected by a naked-eye inspection after five minutes, the result is determined as being "OK".

More specifically, the thickness of the inorganic layer 3140 is between 10 Å and 2 μm; a preferred range is between 50 Å and 500 Å, and the most desirable is 200 Å. In the present embodiment, the material of the inorganic is $SiN_xO_y$, wherein x: 1~3, y: 0~2, z: 0~4. However, the material of the inorganic layer 3140 can be a ceramic material, a DLC or other inorganic material with properties of acid and alkali resistance, transparency and non-conductivity; or composed of plural layers of inorganic material. The ceramic material is generally composed of non-metallic inorganic compound, and the ceramic is selected from one of the groups consisting of $SiO_2$, $TiO_2$, $Ti_xN_yO_z$, quartz, SiOC, $CrO_x$, $CrN_xO_y$, $AlO_x$, $AlN_xO_y$, SiAlON, $ZnO_x$, $YO_x$, and $ZrO_x$. The method of fabricating the color filter substrate 310 is described as follows.

Figure 3A:
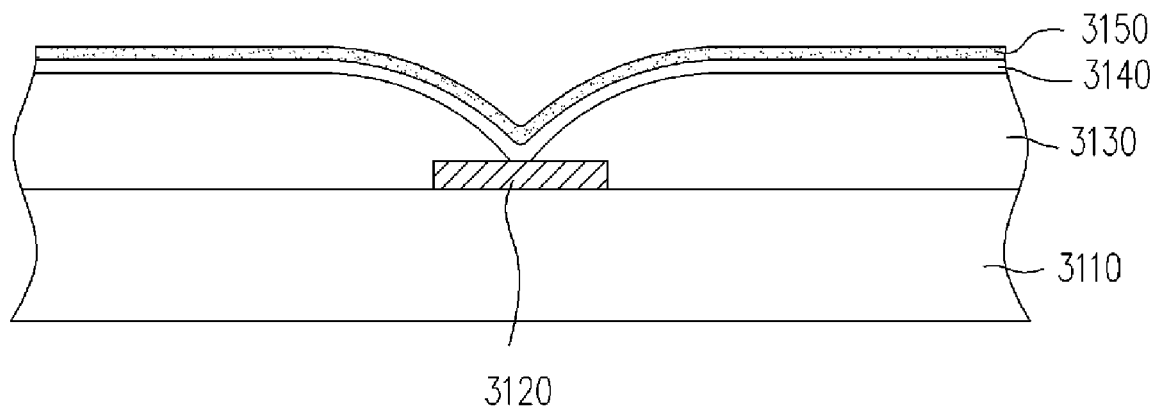
FIGS. 3A to 3B are schematic cross-sectional views illustrating the method of fabricating the color filter substrate according to the first embodiment of the present invention.
Figure 3B:
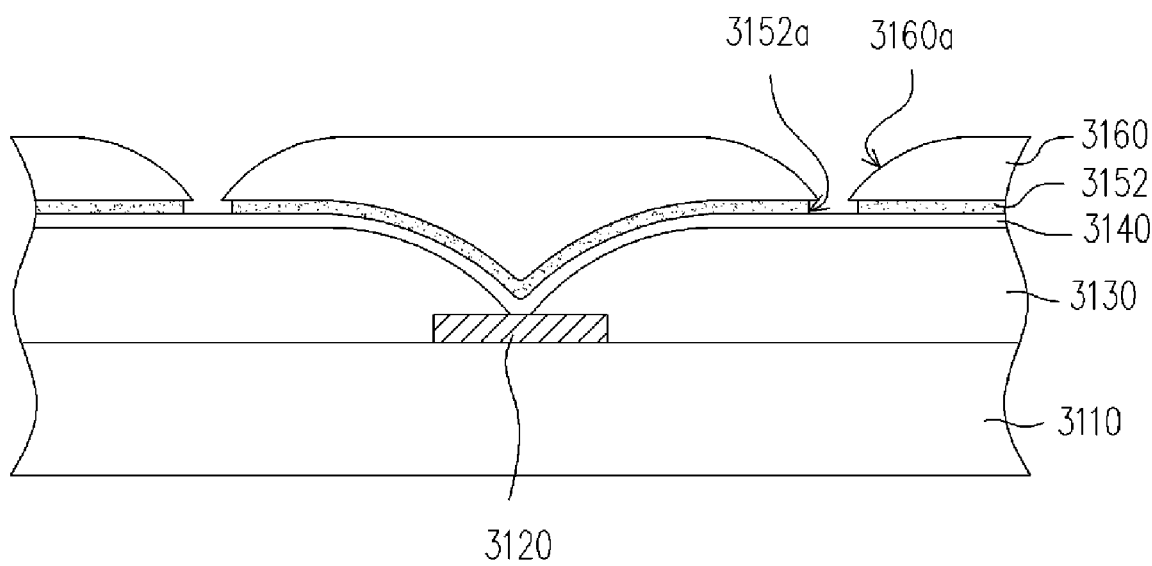

FIGS. 3A to 3B are schematic cross-sectional views illustrating the method of fabricating the color filter substrate according to the first embodiment of the present invention. Referring to FIG. 3A, the fabricating method of the color filter substrate of the present invention includes the following steps: First, a transparent substrate 3110 is provided, and then a black matrix (BM) 3120 is formed on the transparent substrate 3110. When the material of the BM 3120 is light shielding resin, the method of forming the BM 3120 is to form a BM material layer on the transparent substrate 3110, and then an exposure process and a development process are performed to the BM material layer to form the BM 3120. Alternatively, when the material of the BM 3120 is metal, the method of forming the BM 3120 is to form a BM material layer on the transparent substrate 3110, and then sequentially execute an exposure process, a development process, and an etching process on the BM material layer to form the BM 3120.

Then, a color filter layer 3130 is formed on the transparent substrate 3110, wherein the method of forming the color filter layer 3130 can be an exposure process and a development process. Alternatively, the method of forming the color filter layer 3130 can be an ink-jet process. However, the present embodiment does not require the formation of the BM 3120; in the present embodiment, the color filter layer 3130 can be directly formed on the transparent substrate 3110.

Next, an inorganic layer 3140 containing $SiN_xO_y$ is formed. In more detail, the method of forming the inorganic layer 3140 includes, for example, physical vapor deposition (PVD), sputtering process, chemical vapor deposition (CVD), plasma enhance chemical vapor deposition (PECVD) or sol-gel. For the sputtering process, the method of forming the $SiN_xO_y$. For example, the oxygen flow rate is 8 sccm, and the nitrogen flow is 40 sccm. In addition, the sputtering equipment used for the sputtering process can be RF with DC power. In the aspect of sol-gel process, the sol-gel method can be dipping, Spin-On-Glass (SOG), spin coating or spinless coating.

Then, a conductive layer 3150 is formed on the inorganic layer 3140 so as to be above the transparent substrate 3110, the color filter layer 3130 and the BM 3120. The method of forming the conductive layer 3150 can be a sputtering process.

Referring to FIG. 3B, a patterned photoresist layer 3160 is formed on the conductive layer 3150, wherein the patterned photoresist layer 3160 has a plurality of slits 3160a exposing a portion of the conductive layer 3150. Then, an etching process to the conductive layer 3150 is performed using the patterned photoresist layer 3160 as a mask and then a patterned conductive layer 3152 is formed. Wherein, the patterned conductive layer 3152 has a plurality of slits 3152a partially exposing the inorganic layer 3140. Finally, the patterned photoresist layer 3160 is removed. Thereby, the fabrication of the color filter substrate 310 is initially completed, as shown in FIG. 2B.

It should be noted that since the patterned conductive layer 3152 is formed on the inorganic layer 3140, the side etching problem is reduced during the etching process. In other words, comparing with the prior art, the difference between the width of the slits 3152a of the patterned conductive layer 3152 and that of the slits 3160a of the patterned photoresist layer 3160 in the present embodiment is reduced. More specifically, under similar manufacturing conditions, the CD loss in the prior art is larger than 0.6 micrometer, while the present invention reduces the CD loss to 0.2 to 0.3 micrometers. The comparison of alkali resistance and chemical resistance between the color filter substrate 100 formed by the prior art and the color filter substrate 310 formed in the present embodiment will be described below.

As for the alkali resistance, the color filter substrate 100 formed by the prior art and the color filter substrate 310 formed in the present embodiment are placed into potassium hydroxide (KOH) solution at a concentration of 9% and at a temperature of 57° C. When the patterned conductive layer 142 of the color filter substrate 100 formed by the prior art has resulted in the peeling-off problem, the color filter substrate 310 formed in the present embodiment is still in good condition. In other words, comparing with the color filter substrate formed by the prior art, the color filter substrate formed in the present embodiment can effectively prevent the invasion of the ions and the moistures, and accordingly enhance the reliability of the products.

As for the chemical resistance, the color filter substrate 100 formed by the prior art and the color filter substrate 310 formed in the present embodiment are placed into a photoresist removal solution at a temperature of 60° C., wherein the photoresist removal solution is composed of 30% of dimethyl sulfoxide (DMSO) and 70% of monoethanol amine (MEA). When the patterned conductive layer 142 of the color filter substrate 100 formed by the prior art has resulted in the peeling-off problem, the patterned conductive layer 3152 formed in the present embodiment is still in good condition. In other words, comparing with the color filter substrate formed by the prior art, the color filter substrate formed in the present embodiment can effectively prevent the invasion of chemicals so as to advance the follow-up manufacturing process and enhance the reliability of the products.

In view of the above, comparing with the color filter substrate 100 formed by the prior art, the color filter substrate 310 formed in the present embodiment has better acid resistance, alkali resistance, and chemical resistance as the inorganic layer 3140 of the present embodiment is disposed under the patterned conductive layer 310. Moreover, comparing with the color filter substrate formed by the prior art, the color filter substrate 310 formed in the present embodiment can reduce the CD loss so that the color filter substrate 310 can be applied to the products adopting the fine slit design.

The Second Embodiment

Figure 4A:
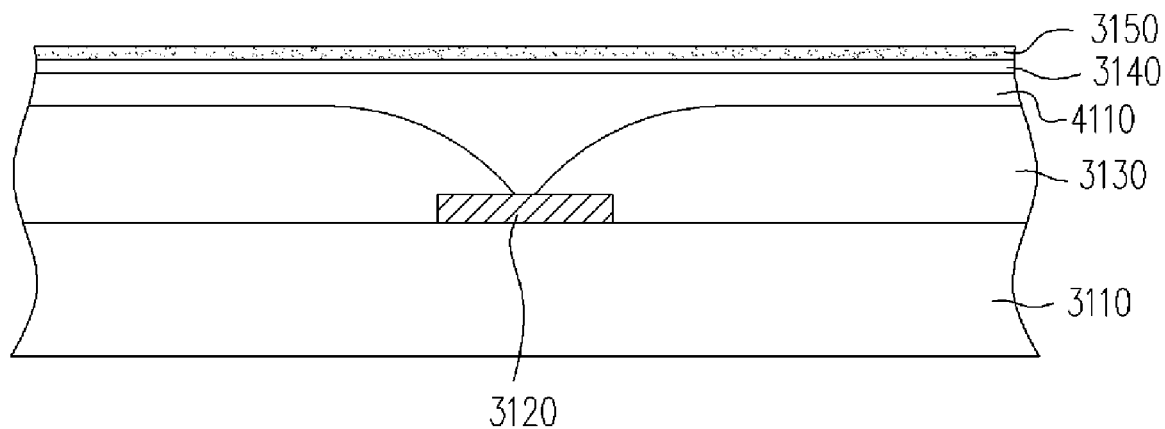
FIGS. 4A to 4C are schematic cross-sectional views illustrating the method of fabricating the color filter substrate according to the second embodiment of the present invention.
Figure 4B:
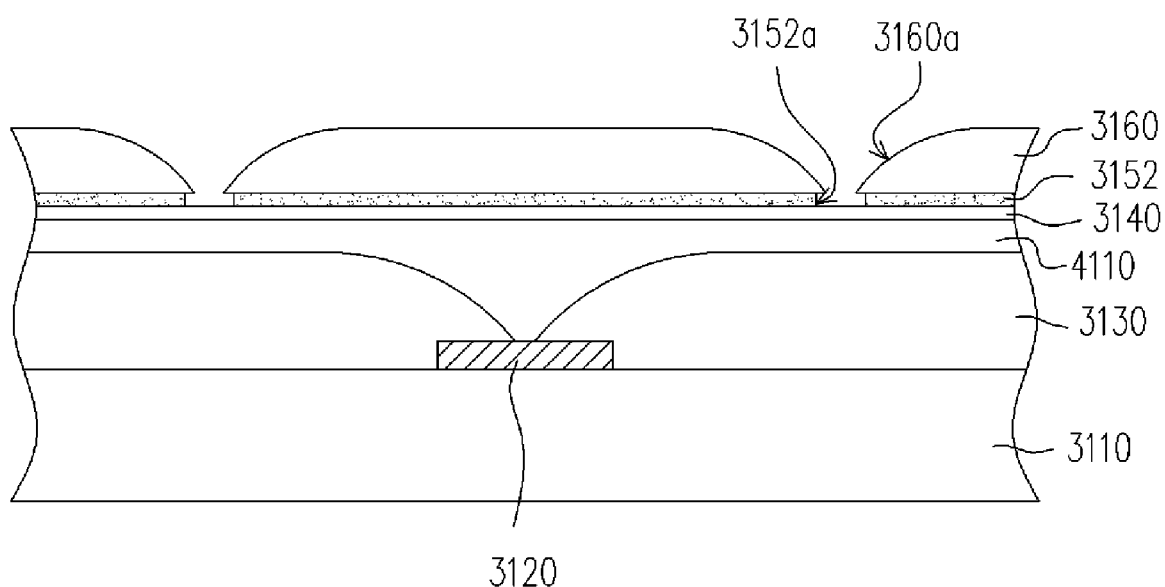
Figure 4C:
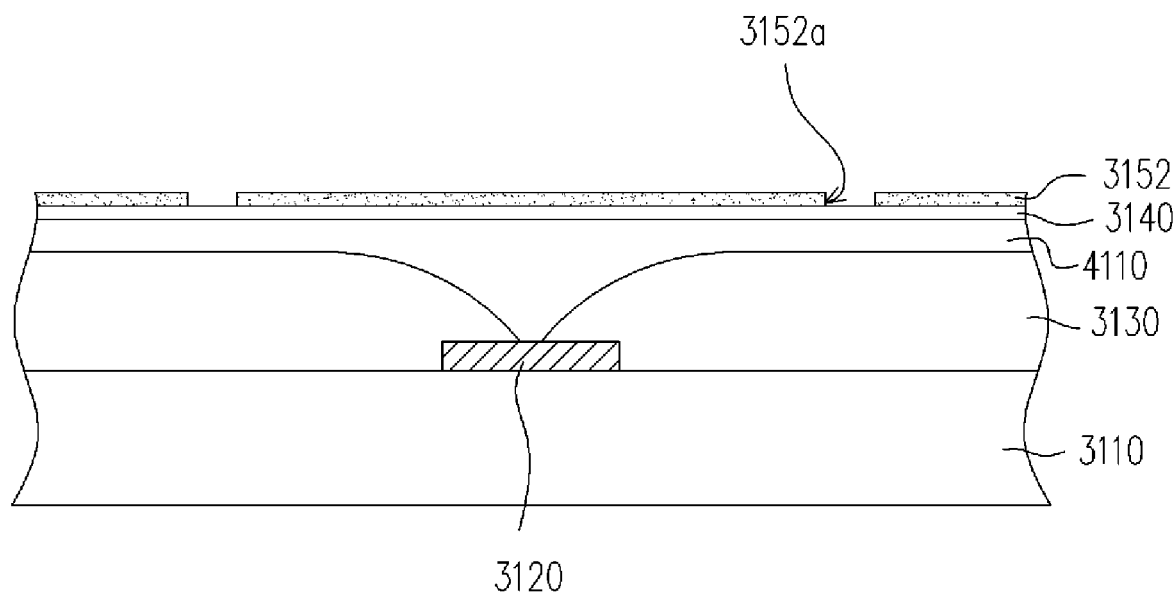

FIGS. 4A to 4C are schematic cross-sectional views illustrating the method of fabricating the color filter substrate according to the second embodiment of the present invention. Please refer to FIG. 4A. The present embodiment is similar to the above-mentioned embodiment, and the difference lies in forming an organic over coating (OC) layer 4110 after forming a BM 3120 and a color filter layer 3130 on the transparent substrate 3110 so as to cover the BM 3120 and the color filter layer 3130. In addition, the method of forming the organic over coating (OC) layer 4110 is, for example, a spin coating or a spinless coating. Furthermore, the organic over coating (OC) layer is, for example, made of photoresist material. Even adopting the lower-grade organic over coating (OC) layer 4110 can prevent the impurities in the color filter layer 3130 from infiltrating into the liquid crystal layer 330, leading to the contamination of the liquid crystals. Next, an inorganic layer 3140 and a conductive layer 3150 are sequentially formed on the organic over coating (OC) layer 4110.

Referring to FIG. 4B, a patterned photoresist layer 3160 is formed on the conductive layer 3150, wherein the patterned photoresist layer 3160 has a plurality of slits 3160a exposing a portion of the conductive layer 3150. Then, an etching process to the conductive layer 3150 is performed with using the patterned photoresist layer 3160 as a mask so as to form a patterned conductive layer 3152. Wherein, the patterned conductive layer 3152 has a plurality of slits 3152a partially exposing the inorganic layer 3140.

Please refer to FIG. 4C. After the patterned conductive layer 3152 is formed, the patterned photoresist layer 3160 is then removed. Thereby, the fabrication of the color filter substrate 410 is initially completed. Similar to the color filter substrate in the first embodiment, the color filter substrate 410 of the present embodiment has better acid resistance, alkali resistance, and chemical resistance. Furthermore, comparing with the color filter substrate formed by the prior art, the color filter substrate 410 formed in the present invention has less CD loss.

Third~Sixth Embodiments

Figure 5A:
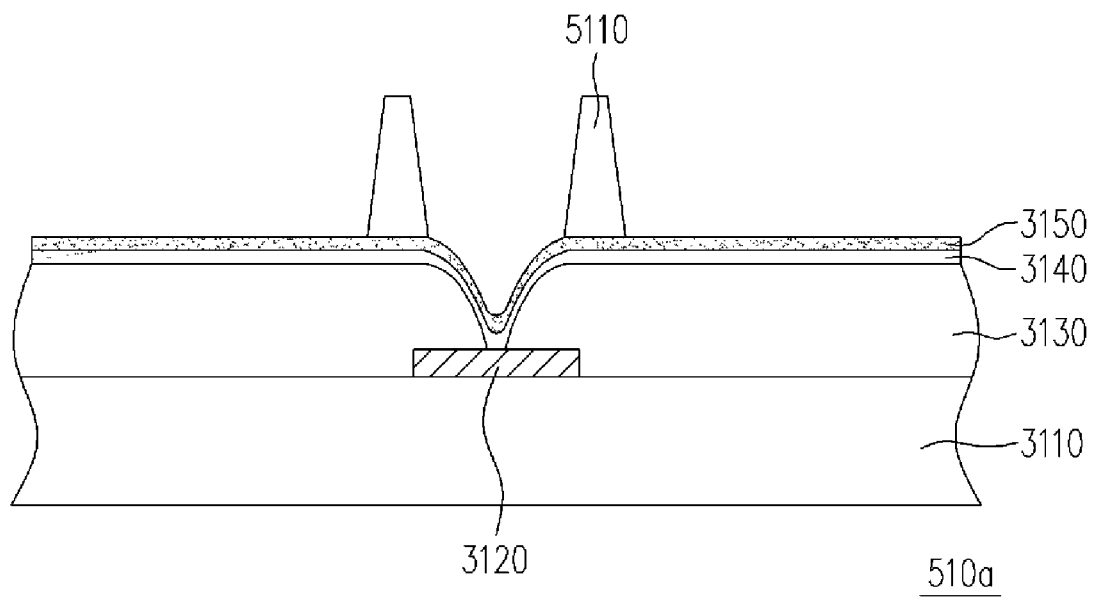
FIGS. 5A to 5D are schematic cross-sectional views of the color filter substrate according to the third, fourth, fifth and six embodiments of the present invention.

FIGS. 5A to 5D are schematic cross-sectional views of the color filter substrate according to the third, fourth, fifth, and six embodiments of the present invention. Referring to FIG. 5A. The difference between the color filter substrate of the present embodiment and that of the first embodiment lies in firstly forming the BM 3120, the color filter layer 3130, the inorganic layer 3140, and the conductive layer 3150 on the transparent substrate 3110, as shown in FIG. 3A. Then, a plurality of spacers 5110 are formed on the conductive layer 3150 so that the fabrication of the color filter substrate 510a is completed. In addition, the material of the spacers 5110 is, for example, photoresist material. Further, the spacers 5110 have a cylindrical shape or a ball shape, for example. Moreover, the spacers may have adhesive property. When the spacers are made of photoresist material, the method of fabricating the spacers 5110 includes: first, forming a photoresist material layer (not shown) on the conductive layer 3150. An exposure and a development process are then performed to the photoresist material layer to form the spacers 5110. In addition, the color filter substrate 510a of the present embodiment can as well be applied to the LCD panel 300 as shown in FIG. 2A. For example, the color filter substrate 510a can be applied to a Twisted Nematic LCD (TN-LCD) device, a Super Twisted Nematic LCD (STN-LCD) device, or a VA-LCD device.

The experimental set of the third embodiment is shown in Table 2.

TABLE 2

| Experiments | Material of inorganic layer | Thickness of inorganic layer (angstrom) | Material of conductive layer | Thickness of conductive layer (angstrom) | Reliability test |
| --- | --- | --- | --- | --- | --- |
| Experiment H | $CrO_x(Cr_2O_3)$ | 250 | ITO | 100 | OK |
| Experiment I | $CrO_x(Cr_2O_3)$ | 250 | ITO | 300 | OK |
| Experiment J | $CrO_x(Cr_2O_3)$ | 250 | ITO | 500 | OK |
| Experiment K | 0 | 0 | ITO | 100 | NG |
| Experiment L | 0 | 0 | ITO | 300 | NG |
| Experiment M | 0 | 0 | ITO | 500 | NG |

The substrate 3110 indicated in Table 3 is, for example, a glass substrate. The substrate 3110 is directly coated with $CrO_x$ and afterwards coated with ITO. Next, the light source of the spectrometer is used as a C-light source to measure the transmission rate when the wavelength is 420 nanometer (nm) or 550 nm.

TABLE 3

| Experiments | Thickness of $CrO_x$ (angstrom) | Thickness of ITO (angstrom) | Transmission Rate (wavelength is 420 nm) | Transmission Rate (wavelength is 550 nm) |
| --- | --- | --- | --- | --- |
| Experiment N | 0 | 700 | 87.21% | 86.20% |
| Experiment O | 88 | 700 | 88.69% | 86.30% |
| Experiment P | 170 | 700 | 90.34% | 85.68% |
| Experiment Q | 260 | 700 | 91.28% | 85.65% |
| Experiment R | 350 | 700 | 90.87% | 86.64% |

Figure 5B:
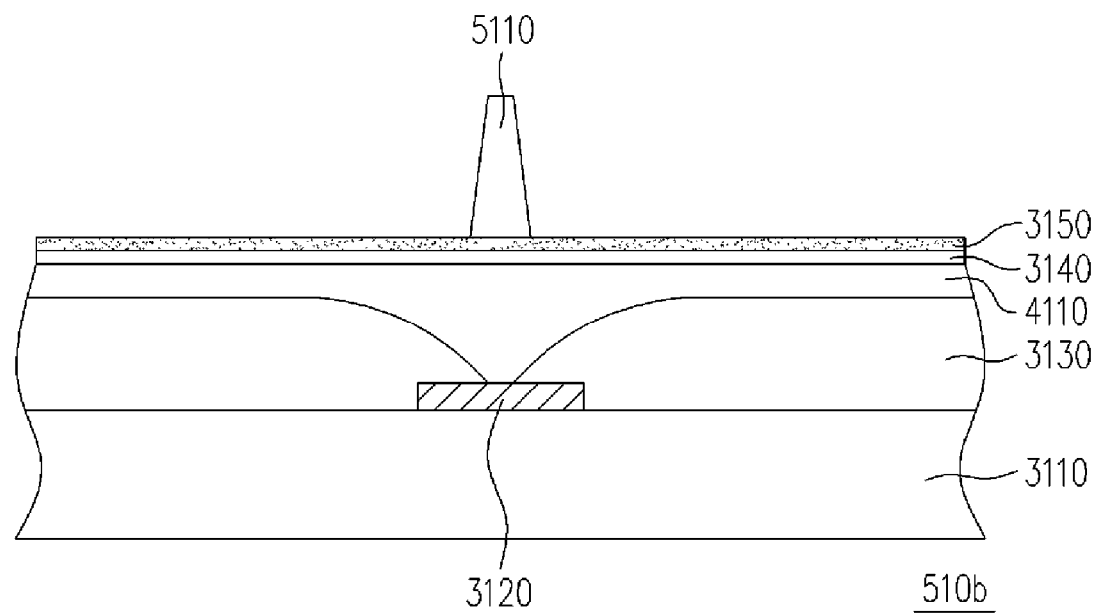

Referring to FIG. 5B, the present embodiment is the fourth embodiment of the present invention, and the difference between the color filter substrate 510b of the present embodiment and that of the second embodiment lies in: firstly forming the BM 3120, the color filter layer 3130, the organic over coating (OC) layer 4140, the inorganic layer 3140, and the conductive layer 3150 sequentially on the transparent substrate 3110, as shown in FIG. 4A. Then, a plurality of spacers 5110 (only one is shown in the FIG. 4A) are formed on the conductive layer 3150 so that the fabrication of the color filter substrate 510b is completed. Similarly, the color filter substrate 510b can also be applied to the LCD panel 300 as shown in FIG. 2A.

In the prior art, in order to prevent the conductive layer 140 from being cracked when the spacers formed thereon are pressed, the thickness of the conductive layer 140 is generally ranged from 1400 Å to 1600 Å. In the present embodiment, however, since the inorganic layer 3140 is disposed below the conductive layer 3150, the thickness of the conductive layer 3150 can be decreased to the range between 100 Å and 1000 Å in comparison with the range in the prior art. In other words, compared with the prior art, the present embodiment decreases manufacturing costs of the color filter substrate, but the pressure resistance remains unchanged. In addition, since the conductive layer 3150 is thinner in the present embodiment, the transmission rate with a wavelength ranging from 420 nm to 550 nm is then promoted. Moreover, since the conductive layer 3150 is thinner in the present embodiment, the offset value of visible light (a red light or a green light, for example) is likewise improved. Besides, since the inorganic layer 3140 is made of transparent material, the light transmission rate is then raised when the inorganic layer 3140 and the conductive layer 3150 have correspondingly appropriate thicknesses. Similarly, the inorganic layer 3140 can also prevent the impurities in the color filter layer 3130 from infiltrating into the liquid crystal layer.

Figure 5C:
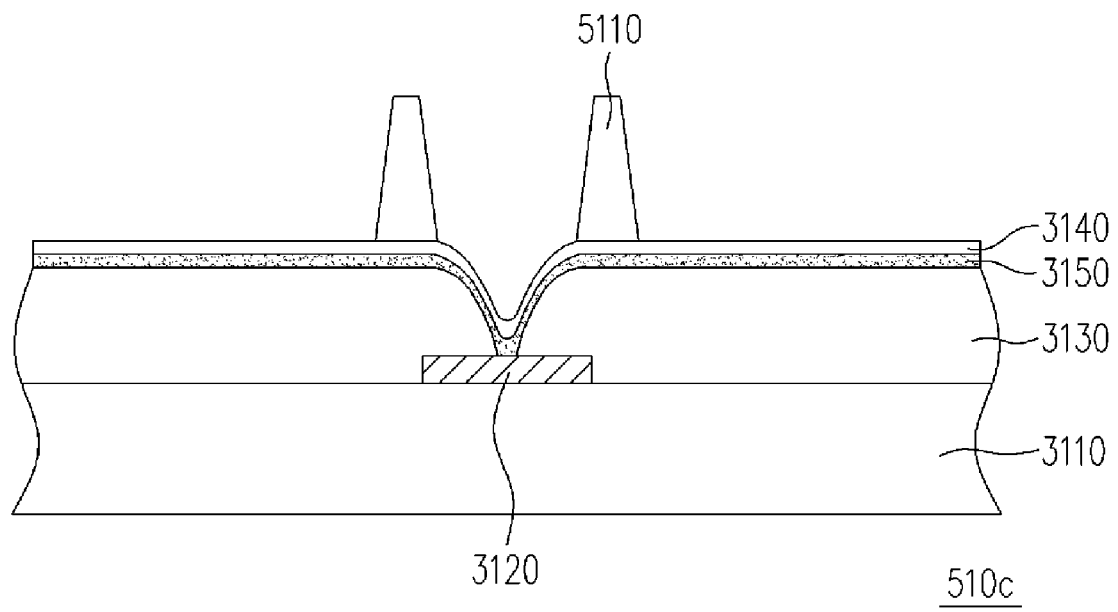

Please refer to FIG. 5C. The present embodiment is the fifth embodiment of the present invention, and the difference between FIG. 5A and FIG. 5C lies in the order of stacking the inorganic layer 3140 and the conductive layer 3150. As shown in FIG. 5C, the conductive layer 3150, the inorganic layer 3140, and the spacers 5110 are sequentially formed in the color filter substrate 510c. Since the inorganic layer 3140 covers the conductive layer 3150, the inorganic layer 3140 can as well prevent the impurities in the color filter layer 3130 from infiltrating into the liquid crystal layer. As shown in FIG. 5E, after the conductive layer 3150 is formed, a plurality of protrusions 6110 (only one is shown in the FIG. 5E) using for adjusting the liquid crystal orientation can further be formed on the conductive layer 3150. The protrusions 6110 can be made of photoresist material. More specifically, the method of forming the protrusions 6110 includes, for example, forming a photoresist material layer (not shown) on the conductive layer 3150. An exposure and a development process are then performed to the photoresist material layer to form the protrusions 6110. The protrusions 6110 are formed, for example, between the inorganic layer and the conductive layer, as shown in FIG. 5E. Certainly, the protrusions 6110 can also be formed above the color filter layer 3130, as shown in FIG. 5F. In addition, the color filter substrate 510a of the present embodiment can also be applied to the LCD panel 300, as shown in FIG. 2A. Thereby, the color filter substrate can be applied to the VA-LCD devices as applications of the patterned conductive layer 3152.

Figure 5D:
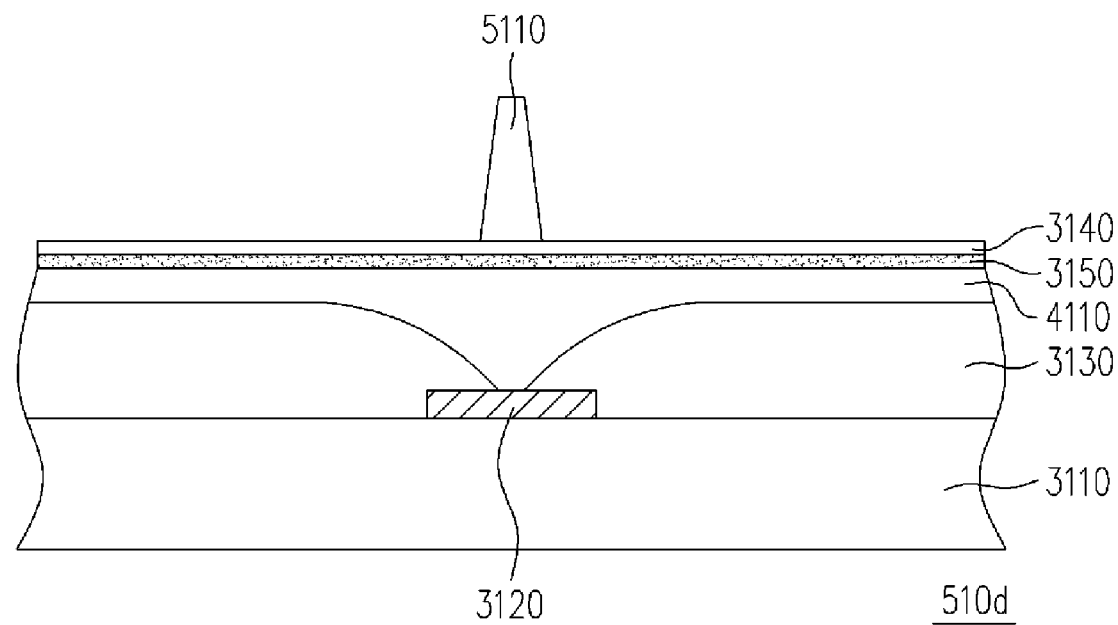
Figure 5E:
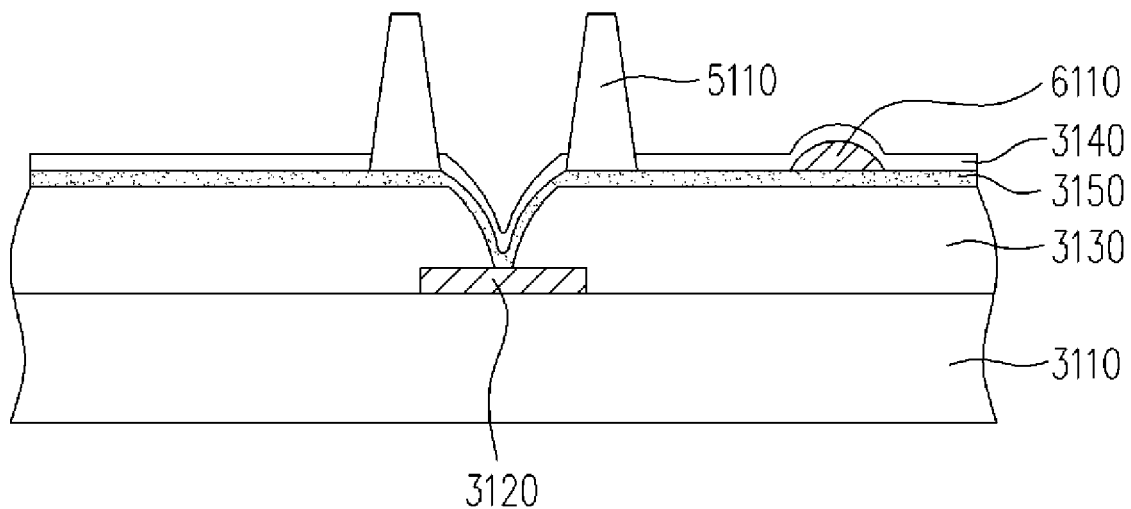
FIG. 5E is a schematic cross-sectional view of another color filter substrate according to the fifth embodiment of the present invention.
Figure 5F:
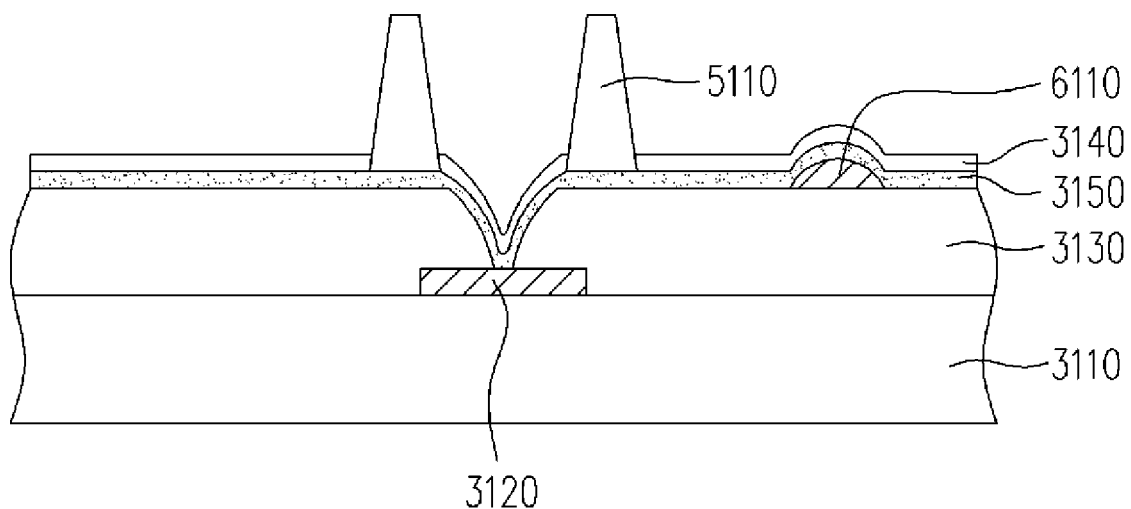
FIG. 5F is a schematic cross-sectional view of yet another color filter substrate according to the fifth embodiment of the present invention.

Please refer to FIG. 5D. The present embodiment is the sixth embodiment of the present invention, and the difference between FIG. 5B and FIG. 5D lies in the order of stacking the inorganic layer 3140 and the conductive layer 3150. As shown in FIG. 5D, the organic over coating (OC) layer 4110, the conductive layer 3150, the inorganic layer 3140, and the spacers 5110 are sequentially formed in the color filter substrate 510d. Since the inorganic layer 3140 covers the conductive layer 3150, the inorganic layer 3140 can also prevent the impurities in the color filter layer 3130 from infiltrating into the liquid crystal layer. Those skilled in the art can be aware of the fact that the embodiments (the third embodiment of FIG. 5A and the fifth embodiment of FIG. 5C, for example) of the present invention illustrate the complete disposition of the spacers on the area above the BM, as provided in the fourth embodiment of FIG. 5B and the sixth embodiment of FIG. 5D.

The Seventh Embodiment

Figure 6A:
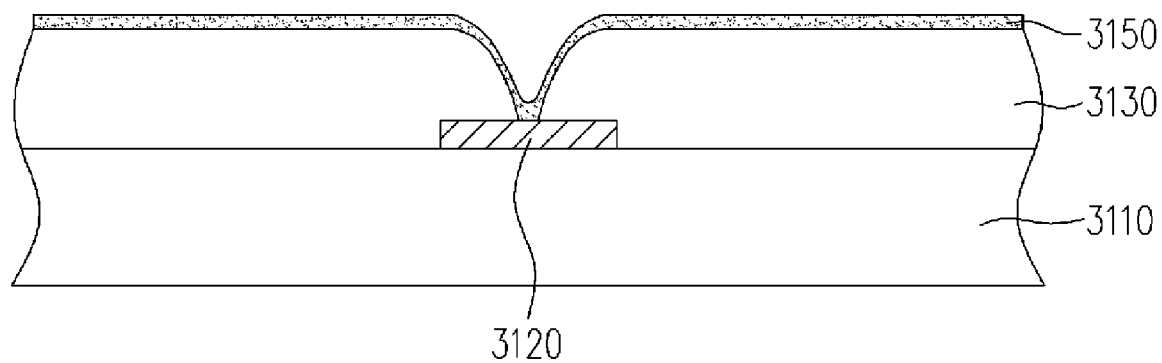
FIGS. 6A to 6C are schematic cross-sectional views illustrating the method of fabricating the color filter substrate according to the seven embodiment of the present invention.
Figure 6B:
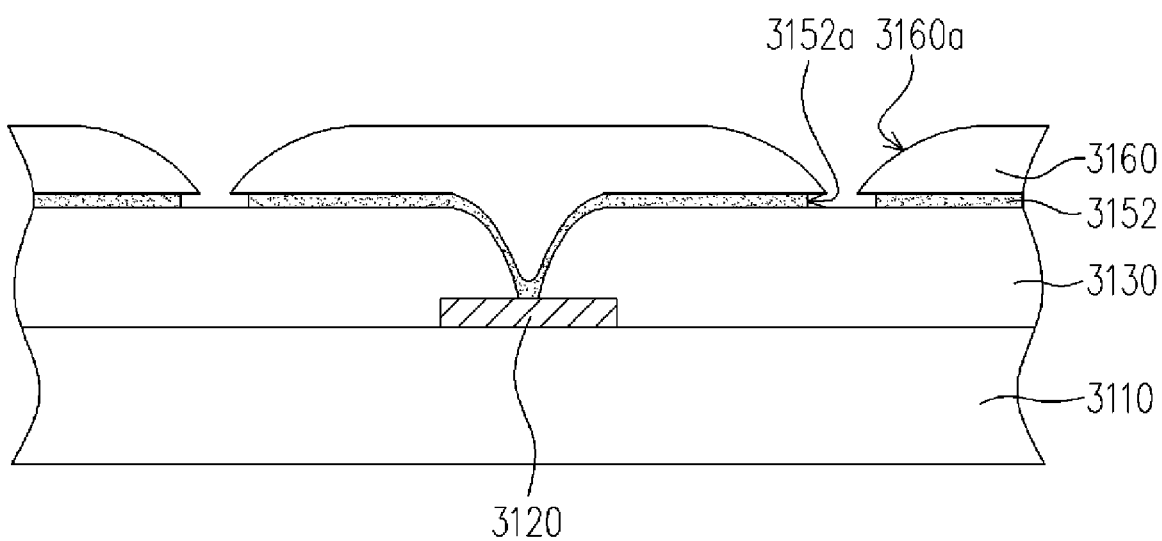
Figure 6C:
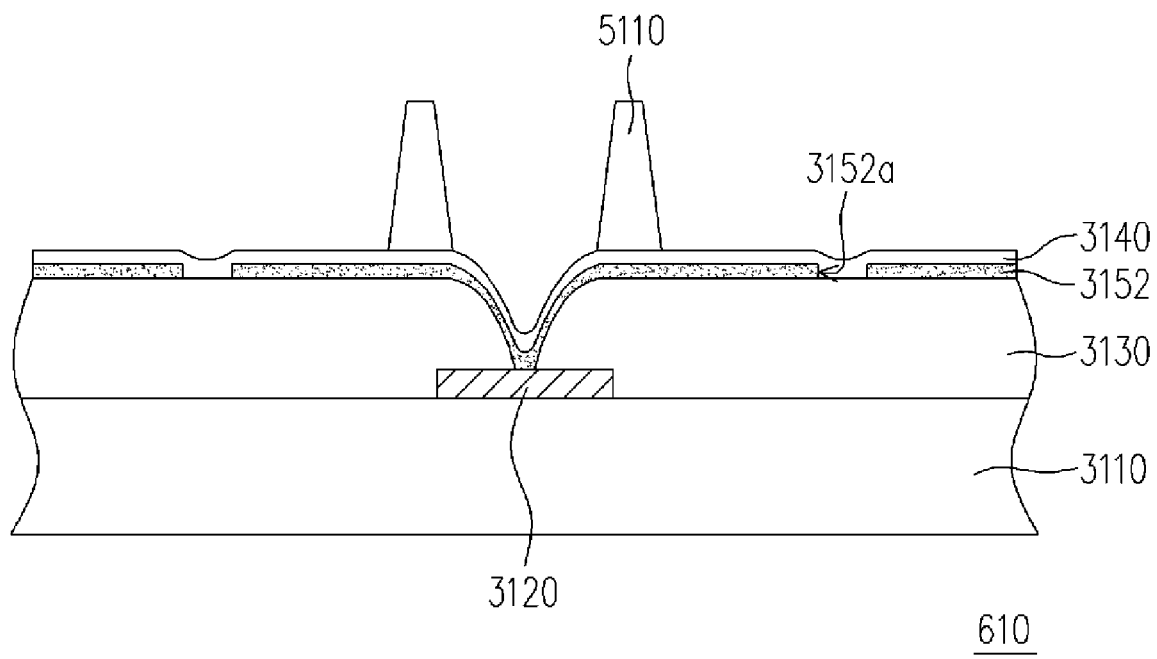

FIGS. 6A to 6C are schematic cross-sectional views illustrating the method of fabricating the color filter substrate according to the seventh embodiment of the present invention. Referring to FIG. 6A, the present embodiment is similar to the first embodiment of the present invention, and the difference lies in: firstly forming the BM 3120 and the color filter layer 3130 on the transparent substrate 3110. Then, the conductive layer 3150 is formed on color filter layer 3130. Next, referring to FIG. 6B, the patterned photoresist layer 3160 is formed on the conductive layer 3150, wherein the patterned photoresist layer 3160 has a plurality of slits 3160a. Afterwards, an etching process is performed to the conductive layer 3150 with using the photoresist layer 3160 as a mask so as to form a patterned conductive layer 3152. Wherein, the patterned conductive layer 3152 has a plurality of slits 3152a.

Please refer to FIG. 6C. After the patterned conductive layer 3152 is formed, the patterned photoresist layer 3160 is then removed. Next, the inorganic layer 3140 and the spacers 5110 are sequentially formed on the patterned conductive layer 3152. Thereby, the fabrication of the color filter substrate 610 is initially completed. Identical to the color filter substrate in the first embodiment, the color filter substrate 610 of the present embodiment has better acid resistance, alkali resistance, and chemical resistance.

Again, please refer to FIG. 6C. More specifically, the difference between the color filter substrate 610 of the present invention and the color filter substrate 410 of the first embodiment lies in the fact that the inorganic layer 3140 is disposed on the patterned conductive layer 3152 and covers the slits 3152a. Accordingly, the color filter substrate 610 can still prevent the impurities in the color filter layer 3130 from infiltrating into the liquid crystal layer 330, leading to the contamination of the liquid crystals. In addition, the inorganic layer 3140 can increase the pressure withstood by the patterned conductive layer 3152 and the spacers 5110.

The Eighth Embodiment

Figure 7A:
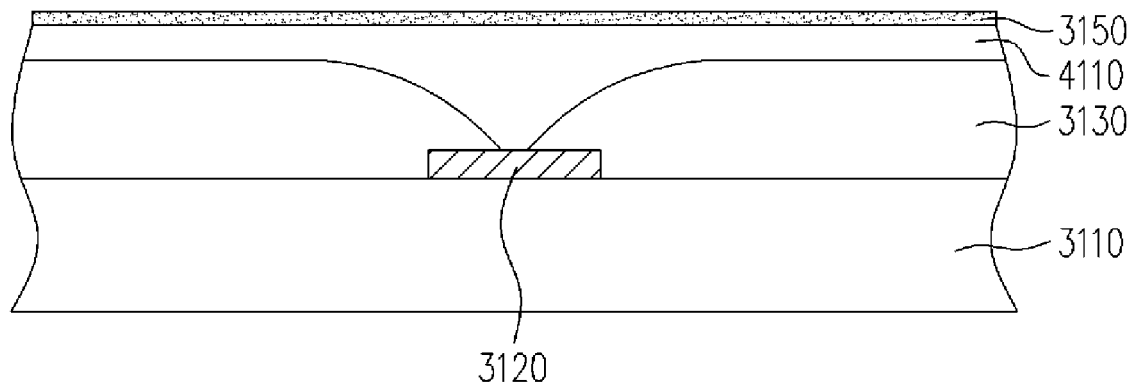
FIGS. 7A to 7C are schematic cross-sectional views illustrating the method of fabricating the color filter substrate according to the eighth embodiment of the present invention.
Figure 7B:
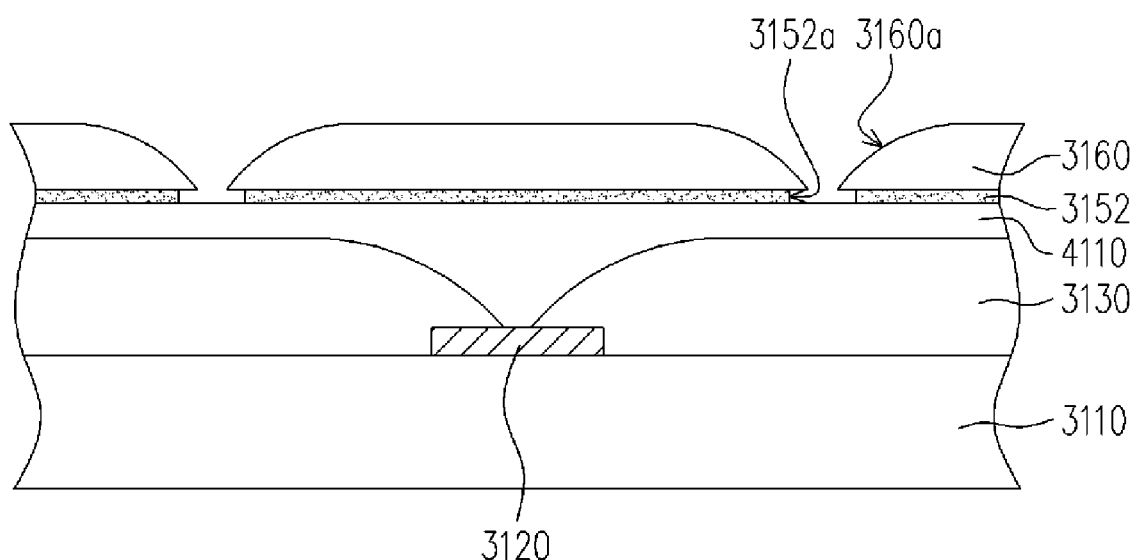
Figure 7C:
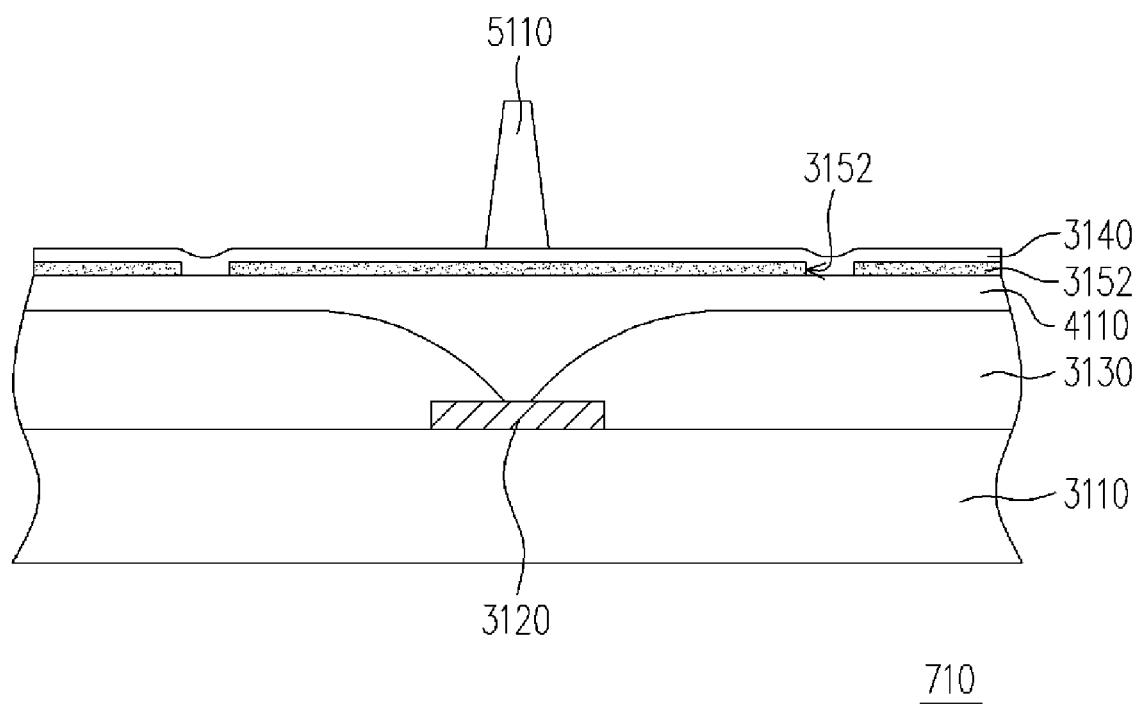

FIGS. 7A to 7C are schematic cross-sectional views illustrating the method of fabricating the color filter substrate according to the eighth embodiment of the present invention. Please refer to FIG. 7A. The present embodiment is similar to the second embodiment of the present invention, and the difference lies in: sequentially forming the BM 3120, the color filter layer 3130, and the organic over coating layer 4110 on the transparent substrate 3110. Then, the conductive layer 3150 is formed on the organic over coating layer 4110. Here, the organic over coating layer 4110 is in contact with the conductive layer 3150. Next, referring to FIG. 7B, an etching process is performed to the conductive layer 3150. More specifically, the patterned photoresist layer 3160 is firstly formed on the conductive layer 3150, wherein the patterned photoresist layer 3160 has a plurality of slits 3160a. Afterwards, an etching process is performed to conductive layer 3150 with using the photoresist layer 3160 as a mask so as to form a patterned conductive layer 3152. Wherein, the patterned conductive layer 3152 has a plurality of slits 3152a.

Please refer to FIG. 7C. After the patterned photoresist layer 3160 is removed, the inorganic layer 3140 and the spacers 5110 are sequentially formed on the patterned conductive layer 3152, and the inorganic layer 3140 is in contact with the spacers 5110. Thereby, the fabrication of the color filter substrate 710 is initially completed. Identical to the color filter substrate in the second embodiment, the color filter substrate 710 of the present embodiment has better acid resistance, alkali resistance, and chemical resistance. Similarly, since the inorganic layer 3140 is disposed on the patterned conductive layer 3152, the inorganic layer 3140 can prevent the impurities in the color filter layer 3130 from infiltrating into the liquid crystal layer, leading to the contamination of the liquid crystals. Furthermore, even adopting the lower-grade (with lower cost in comparison with that in the prior art) organic over coating layer 4110 can prevent the impurities in the color filter layer 3130 from infiltrating into the liquid crystal layer 330, leading to the contamination of the liquid crystals. In addition, the inorganic layer 3140 can also increase the pressure withstood by the patterned conductive layer 3152 and the spacers 5110.

The Ninth Embodiment

Figure 8:
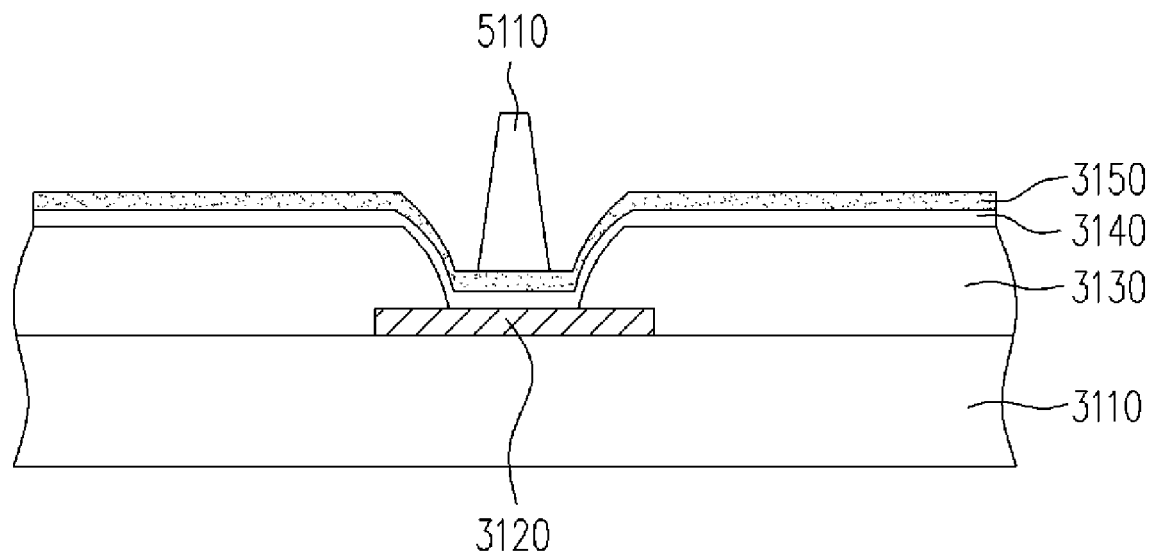
FIG. 8 is a schematic cross-sectional view illustrating the method of fabricating the color filter substrate according to the ninth embodiment of the present invention.

FIG. 8 is a schematic cross-sectional view illustrating the method of fabricating the color filter substrate according to the ninth embodiment of the present invention. Please refer to FIG. 8. The present embodiment is similar to the third embodiment, and the difference lies in: sequentially forming the BM 3120, the color filter layer 3130, the inorganic layer 3140, and the conductive layer 3150 on the transparent substrate 3110. The spacers 5110 are then formed over the conductive layer 3150 within the area above the BM 3120. The conductive layer 3150 is in contact with the spacers 5110. In addition, the spacers 5110 are merely disposed within the area above the BM 3120, which further prevents the spacers from being cracked as being pressed, leading to the contamination of the liquid crystals by the infiltration of the impurities into the color filter layer 3110. Those skilled in the art can be aware of the fact that before or after the spacers 5110 are formed, the conductive layer 3150 of the present embodiment can be patterned to form the patterned conductive layer 3152.

The Tenth Embodiment

Figure 9:
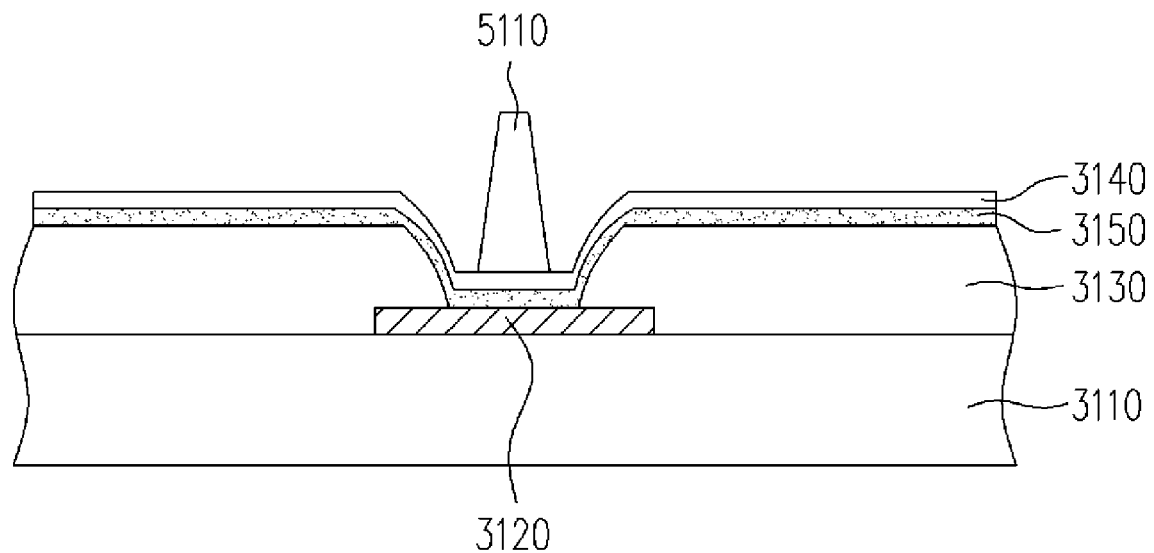
FIG. 9 is a schematic cross-sectional view illustrating the method of fabricating the color filter substrate according to the tenth embodiment of the present invention.

FIG. 9 is a schematic cross-sectional view illustrating the method of fabricating the color filter substrate according to the tenth embodiment of the present invention. Please refer to FIG. 9. The present embodiment is similar to the ninth embodiment, and the difference lies in: sequentially forming the BM 3120, the color filter layer 3130, the conductive layer 3150, and the inorganic layer 3140 on the transparent substrate 3110. The spacers 5110 are then formed over the inorganic layer 3140 within the area above the BM 3120, and the inorganic layer 3140 is in contact with the spacers 5110. Similarly, the spacers 5110 are merely disposed within the area above the BM 3120, which further prevents the spacers from being cracked as being pressed, leading to the contamination of the liquid crystals by the infiltration of the impurities into the color filter layer 3110. Those skilled in the art can be aware of the fact that before the inorganic layer 3140 is formed, the conductive layer 3150 of the present invention can be patterned to form the patterned conductive layer 3152.

The Eleventh Embodiment

Figure 10A:
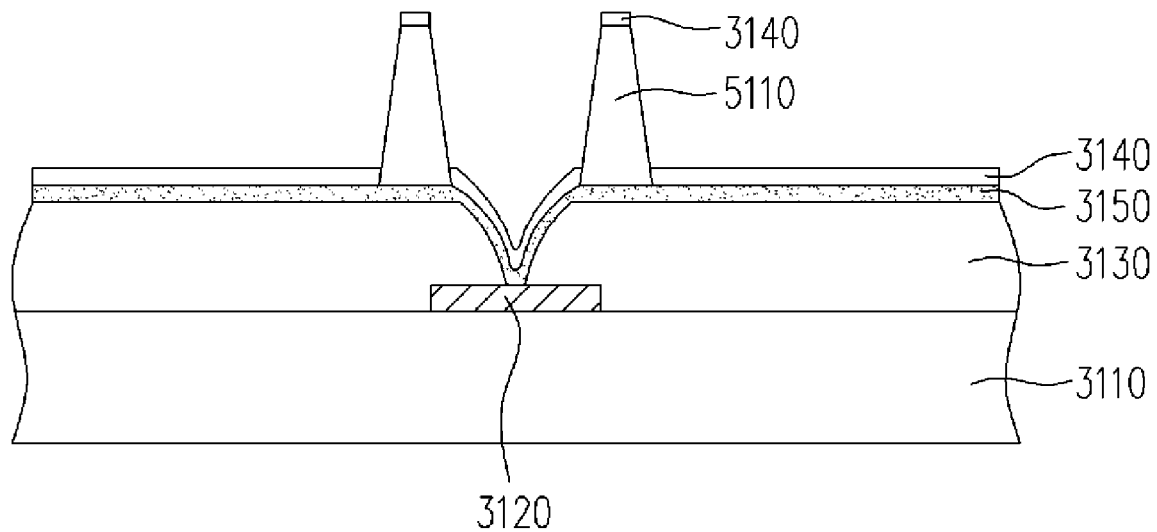
FIGS. 10A to 10C are schematic cross-sectional views illustrating three methods of fabricating the color filter substrate according to the eleventh embodiment of the present invention.
Figure 10B:
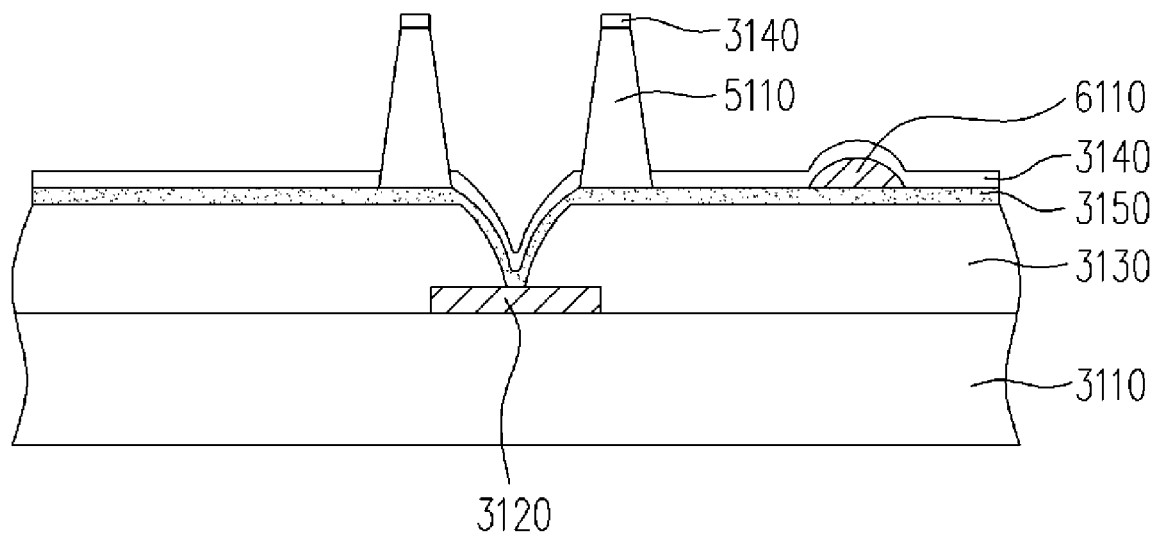
Figure 10C:
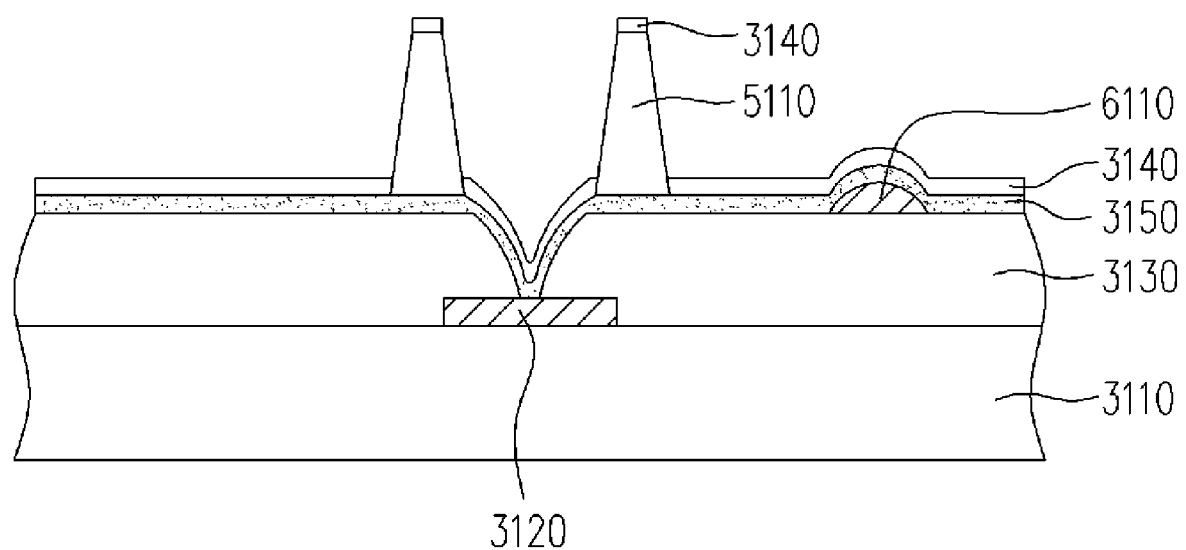

FIGS. 10A to 10C are schematic cross-sectional views illustrating three methods of fabricating the color filter substrate according to the eleventh embodiment of the present invention. Please refer to FIG. 10A. The present embodiment is similar to the fifth embodiment of the present invention, and the difference lies in: sequentially forming the BM 3120, the color filter layer 3130, the conductive layer 3150, and the spacers 5110 on the transparent substrate 3110. Then, the inorganic layer 3140 is formed. Wherein, a portion of the inorganic layer 3140 is formed on the top of the spacers 5110 and is in contact therewith. Those skilled in the art can be aware of the fact that before the inorganic layer 3140 is formed, the conductive layer 3150 of the present invention can be patterned to form the patterned conductive layer 3152. The order of formation of the BM 3120 and the color filter layer 3130 is, for example, firstly forming the color filter layer 3130. The BM 3120 is then formed. After the conductive layer 3150 is formed, the protrusions 6110 as domain adjustable structures can be formed for adjusting the liquid crystal orientation. Next, the inorganic layer 3140 is used to cover the protrusions 6110, as shown in FIG. 10B. Besides, please refer to FIG. 10C. After the color filter layer 3130 is formed and the protrusions 6110 as domain adjustable structures are then formed for adjusting the liquid crystal orientation, the conductive layer 3150 and the inorganic layer 3140 sequentially covers the protrusions 6110. Accordingly, the inorganic layer 3140 not only improves the color filter layer 3130 but also prevents the impurities in the protrusions 6110 as domain adjustable structures from infiltrating into the liquid crystal layer and contaminating the liquid crystals. The inorganic layer 3140 can further increase the pressure withstood by the patterned conductive layer 3152 and the spacers 5110, and prevent the foreign objects generated during the manufacturing process from electrically connecting the two substrates and affecting the quality of displays.

The Twelfth Embodiment

Figure 11A:
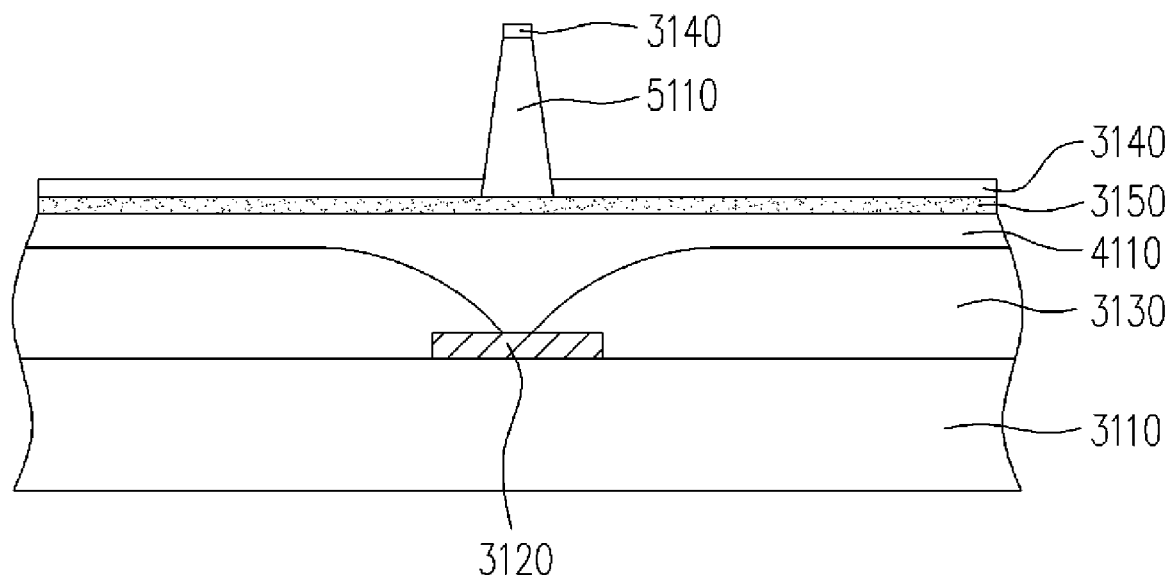
FIGS. 11A to 11C are schematic cross-sectional views illustrating three methods of fabricating the color filter substrate according to the twelfth embodiment of the present invention.
Figure 11B:
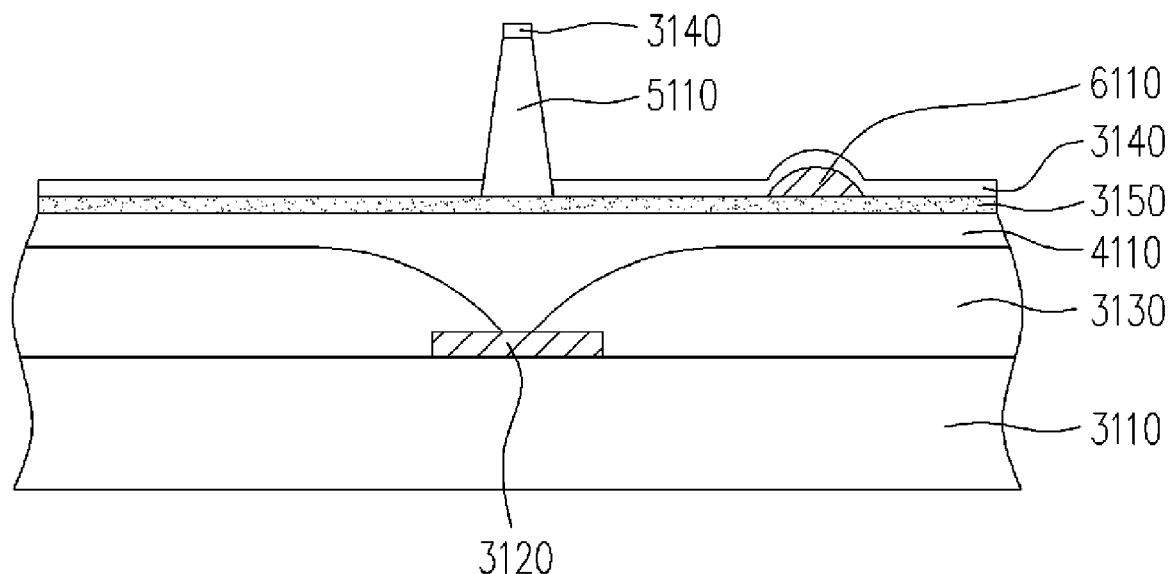
Figure 11C:
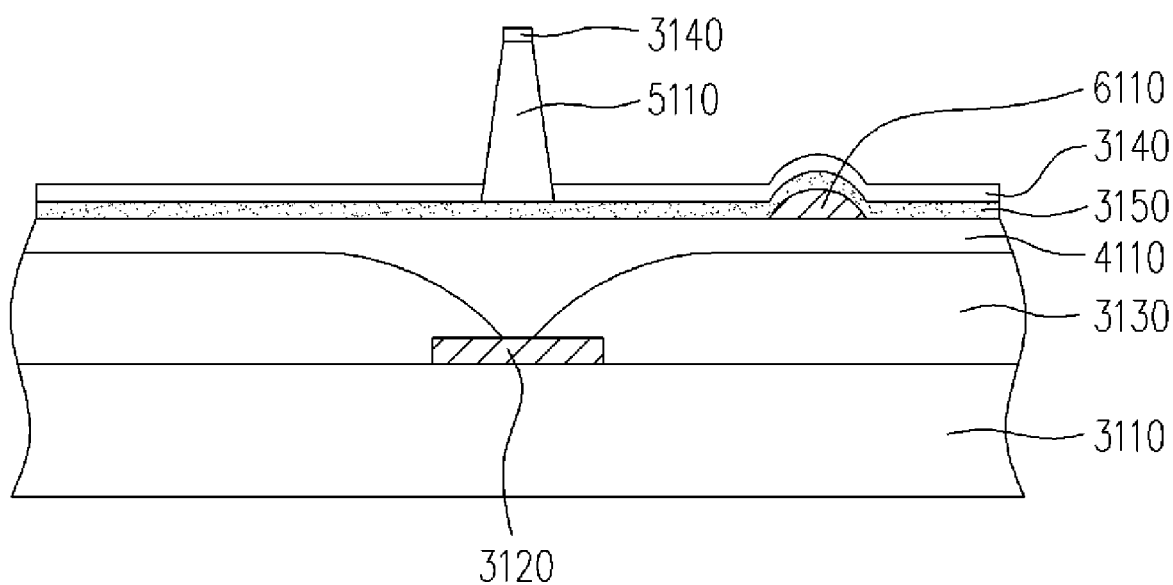

FIGS. 11A to 11C are schematic cross-sectional views illustrating three methods of fabricating the color filter substrate according to the twelfth embodiment of the present invention. Please refer to FIG. 11A. The present embodiment is similar to the sixth embodiment of the present invention, and the difference lies in: sequentially forming the BM 3120, the color filter layer 3130, the organic over coating layer 4110, the conductive layer 3150, and the spacers 5110 on the transparent substrate 3110. Then, the inorganic layer 3140 is formed on the spacers 5110 and is in contact therewith. Those skilled in the art can be aware of the fact that before the inorganic layer 3140 is formed, the conductive layer of the present invention can be patterned to form the patterned conductive layer 3152. The order of formation of the BM 3120 and the color filter layer 3130 is, for example, firstly forming the color filter layer 3130. The BM 3120 is then formed. In addition, after the conductive layer 3150 is formed, the protrusions 6110 as domain adjustable structures can be formed for adjusting the liquid crystal orientation. Next, the inorganic layer 3140 is used to cover the protrusions 6110, as shown in FIG. 11B. Also, after the organic over coating layer 4110 is formed and the protrusions 6110 as domain adjustable structures are then formed for adjusting the liquid crystal orientation, the conductive layer 3150 and the inorganic layer 3140 sequentially covers the protrusions 6110, as shown in FIG. 11C. Accordingly, the inorganic layer 3140 not only improves the color filter layer 3130 as well as the organic over coating layer 4110, but also prevents the impurities in the protrusion 6110 as domain adjustable structures from infiltrating into the liquid crystal layer and contaminating the liquid crystals. The inorganic layer 3140 can further increase the pressure withstood by the patterned conductive layer 3152 and the spacers 5110, and prevent the foreign objects generated during the manufacturing process from electrically connecting the two substrates and affecting the quality of displays.

It should be noted that in the afore-mentioned embodiments, if the inorganic layer is formed in the last step of manufacturing the color filter substrate, the inorganic layer covering the electric contacts of the color filter substrate can be removed by a normal etching process. Alternatively, a mask can be used to cover the electric contacts connecting the color filter substrate and the thin film transistor array substrate before the formation of the inorganic layer.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display (LCD) device, comprising:
   a backlight module;
   a liquid crystal display (LCD) panel, disposed above the backlight module, wherein the LCD panel comprises:
   a color filter substrate, comprising:
      a transparent substrate;
      a color filter layer, disposed on the transparent substrate;
      a first layer and a second layer, the first layer disposed between the color filter layer and the second layer;
      an opposite substrate;
      a liquid crystal layer, disposed between the second layer and the opposite substrate, wherein the first layer is one of an inorganic layer or a conductive layer and the second layer is the other of the inorganic layer or the conductive layer; and
      a plurality of spacers disposed between the inorganic layer and the opposite substrate, wherein
      the conductive layer is patterned with a plurality of slits; and
      the inorganic layer is capable of reducing side etching of the conductive layer during patterning thereof.

2. The LCD device as claimed in claim 1, wherein the first layer is in contact with the second layer.

3. The LCD device as claimed in claim 1, wherein the second layer is the inorganic layer.

4. The LCD device as claimed in claim 1, wherein the second layer is the conductive layer.

5. The LCD device as claimed in claim 1, wherein the color filter substrate further comprises a plurality of protrusions disposed between the first layer and the second layer.

6. The LCD device as claimed in claim 1, wherein the color filter substrate further comprises a plurality of protrusions disposed between the color filter layer and the first layer.

7. The LCD device as claimed in claim 1, wherein the color filter substrate further comprises a black matrix, disposed on the transparent substrate, and the color filter layer covers at least a portion of the black matrix.

8. The LCD device as claimed in claim 7, wherein the plurality of spacers are disposed over the black matrix and directly in contact with the conductive layer.

9. The LCD device as claimed in claim 1, wherein the color filter substrate further comprises an organic over coating layer disposed between the transparent substrate and first layer.

10. The LCD device as claimed in claim 1, wherein the second layer is disposed on the first layer, and the first layer is the conductive layer.

11. The LCD device as claimed in claim 1, wherein a material of the inorganic layer comprises ceramic or diamond like carbon.

12. The LCD device as claimed in claim 11, wherein the ceramic is one selected from the groups consisting of $SiO_2$, $SiN_xO_y$, $TiO_2$, TiNO, quartz, SiOC, $CrO_x$, $CrN_xO_y$, $AlO_x$, and $AlN_xO_y$.

13. The LCD device as claimed in claim 1, wherein a thickness of the inorganic layer is between 10 angstrom and 2 micrometer.

14. The LCD device as claimed in claim 13, wherein a thickness of the inorganic layer is between 50 angstrom and 500 angstrom.

15. The LCD device as claimed in claim 1, wherein a thickness of the conductive layer is between 100 angstrom and 1000 angstrom.

16. The LCD device as claimed in claim 1, wherein the LCD panel further comprises a sealant, disposed between the color filter substrate and the opposite substrate, the sealant encompassing the liquid crystal layer.

17. A liquid crystal display (LCD) panel, comprising:
   a color filter substrate, comprising:
      a transparent substrate;
      a color filter layer, disposed on the transparent substrate;
      a conductive layer, the conductive layer being patterned with a plurality of slits;
      an inorganic layer disposed between the conductive layer and the color filter layer, the inorganic layer being capable of reducing side etching of the conductive layer during patterning thereof;
   an opposite substrate; and
   a liquid crystal layer, disposed between the color filter substrate and the opposite substrate.

18. The LCD panel as claimed in claim 17, wherein the conductive layer is in contact with the inorganic layer.

19. The LCD panel as claimed in claim 17, wherein the color filter substrate further comprises a plurality of spacers, disposed on the inorganic layer or on the conductive layer.

20. The LCD panel as claimed in claim 19, wherein the spacers are disposed on the color filter layer and directly in contact with the conductive layer.

21. A liquid crystal display (LCD) panel, comprising:
   a transparent substrate;
   a color filter layer disposed on the transparent substrate;
   an opposite substrate;
   a conductive layer arranged between the opposite substrate and the color filter layer;
   a liquid crystal layer, disposed between the color filter layer and the opposite substrate; and
   an inorganic layer disposed in direct contact with the conductive layer for minimizing a transfer of contamination between the color filter layer and the liquid crystal layer and side etching of the conductive layer during patterning thereof, wherein the inorganic layer is one selected from the groups consisting of $SiN_xO_y$, $TiO_2$, TiNO, quartz, SiOC, $CrO_x$, $CrN_xO_y$, $AlO_x$, and $AlN_xO_y$.

22. The LCD panel as claimed in claim 21, further comprising a plurality of spacers disposed on the inorganic layer and on the conductive layer.

23. The LCD panel as claimed in claim 22, wherein the spacers are disposed directly in contact with the inorganic layer.

24. The LCD panel as claimed in claim 22, wherein the spacers are directly in contact with the conductive layer.

25. The LCD panel as claimed in claim 22, wherein the spacers are disposed on the conductive layer, and are between the conductive layer and the inorganic layer.

26. The LCD panel as claimed in claim 22, wherein the conductive layer is a patterned conductive layer, and the patterned conductive layer has a plurality of slits.

* * * * *